United States Patent
Raike et al.

(10) Patent No.: US 12,515,048 B2
(45) Date of Patent: Jan. 6, 2026

(54) NON-CONTINUOUS ELECTRICAL STIMULATION THERAPY

(71) Applicant: Medtronic, Inc., Minneapolis, MN (US)

(72) Inventors: Robert S. Raike, Minneapolis, MN (US); Timothy J. Denison, Minneapolis, MN (US); Steven M. Goetz, North Oaks, MN (US); William J. George, Hudson, WI (US); Jonathon E. Giftakis, Maple Grove, MN (US); Lothar Krinke, Eden Prairie, MN (US); Gregory F. Molnar, Blaine, MN (US); Paul H. Stypulkowski, North Oaks, MN (US); Scott R. Stanslaski, Shoreview, MN (US)

(73) Assignee: Medtronic, Inc., Minneapolis, MN (US)

( * ) Notice: Subject to any disclaimer, the term of this patent is extended or adjusted under 35 U.S.C. 154(b) by 814 days.

(21) Appl. No.: 15/926,113

(22) Filed: Mar. 20, 2018

(65) Prior Publication Data

US 2019/0290912 A1 Sep. 26, 2019

(51) Int. Cl.
*A61N 1/36* (2006.01)
*A61B 5/31* (2021.01)
(Continued)

(52) U.S. Cl.
CPC ............ *A61N 1/36139* (2013.01); *A61B 5/31* (2021.01); *A61N 1/0534* (2013.01);
(Continued)

(58) Field of Classification Search
CPC ............ A61N 1/36139; A61N 1/36135; A61N 1/36178; A61N 1/36; A61N 1/36146;
(Continued)

(56) References Cited

U.S. PATENT DOCUMENTS 8,280,514 B2 10/2012 Lozano et al.
8,914,119 B2 12/2014 Wu et al.
(Continued)

FOREIGN PATENT DOCUMENTS

CN 103501855 A 1/2014

OTHER PUBLICATIONS

Tinkhauser, et al., "Beta burst dynamics in Parkinson's disease off and on dopaminergic medication," Brain, a Journal of Neurology, Aug. 2017, pp. 2968-2981.
(Continued)

*Primary Examiner* — Deborah L Malamud
(74) *Attorney, Agent, or Firm* — Shumaker & Sieffert, P.A.

(57) ABSTRACT

Techniques, systems, and devices are disclosed for delivering stimulation therapy to a patient. In one example, a medical device senses, via one or more electrodes, one or more oscillations of a bioelectrical signal of a brain of a patient. In response to sensing the one or more oscillations, the medical device generates a plurality of bursts of stimulation therapy pulses, the plurality of bursts comprising an inter-burst frequency selected based on a frequency of the one or more oscillations of the bioelectrical signal. Further, the medical device delivers the plurality of bursts of stimulation therapy pulses to the patient to modulate a state of the patient associated with the one or more oscillations of the bioelectrical signal.

39 Claims, 5 Drawing Sheets

(51) Int. Cl.
    *A61N 1/05*         (2006.01)
    *A61B 5/375*      (2021.01)
    *A61N 1/372*      (2006.01)

(52) U.S. Cl.
CPC ..... *A61N 1/36071* (2013.01); *A61N 1/36078* (2013.01); *A61N 1/36096* (2013.01); *A61N 1/36171* (2013.01); *A61N 1/36178* (2013.01); *A61B 5/375* (2021.01); *A61N 1/0536* (2013.01); *A61N 1/0551* (2013.01); *A61N 1/36062* (2017.08); *A61N 1/36064* (2013.01); *A61N 1/36067* (2013.01); *A61N 1/36153* (2013.01); *A61N 1/37247* (2013.01)

(58) Field of Classification Search
CPC .... A61N 1/0529; A61N 1/36171; A61N 1/00; A61N 1/04; A61N 1/18; A61N 1/36128; A61N 1/36196; A61N 1/08; A61N 1/3603; A61N 1/36031; A61N 1/36189; A61B 5/4836; A61B 5/0484; A61B 5/4848; A61B 5/04001; A61B 5/0476; A61B 5/0482; A61B 5/6868; A61B 5/05; A61B 5/0478; A61B 5/4064; A61B 5/04; A61B 5/04004; A61B 5/486; G16H 50/20; G06F 19/3418

See application file for complete search history.

(56) References Cited

U.S. PATENT DOCUMENTS

| | | | |
|---|---|---|---|
| 9,421,377 | B2 | 8/2016 | Venkatesan et al. |
| 2004/0153129 | A1 | 8/2004 | Pless et al. |
| 2005/0277995 | A1 | 12/2005 | Gill |
| 2006/0015153 | A1 | 1/2006 | Gliner et al. |
| 2006/0095088 | A1 | 5/2006 | De Ridder |
| 2007/0225674 | A1 | 9/2007 | Molnar et al. |
| 2009/0082691 | A1 | 3/2009 | Denison et al. |
| 2011/0184489 | A1 | 7/2011 | Nicolelis et al. |
| 2012/0277820 | A1 | 11/2012 | Wu et al. |
| 2016/0287879 | A1 | 10/2016 | Denison et al. |
| 2016/0296759 | A1 | 10/2016 | Cong et al. |
| 2017/0001016 | A1* | 1/2017 | De Ridder ......... A61N 1/36135 |

OTHER PUBLICATIONS

Buzsáki, et al., "Neuronal oscillations in cortical networks," Science. Jun. 2004;304(5679), pp. 1926-1929.
Little, et al., "The functional role of beta oscillations in Parkinson's disease," Parkinsonism Relat Disord. Jan. 2014 ;20 Suppl 1: pp. S44-48.
Brown, et al., "Dopamine dependency of oscillations between subthalamic nucleus and pallidum in Parkinson's disease," J Neurosci 21, Feb. 1, 2001, pp. 1033-1038.
Kuhn, et al., "High-frequency stimulation of the subthalamic nucleus suppresses oscillatory beta activity in patients with Parkinson's disease in parallel with improvement in motor performance," J Neurosci 28: Jun. 11, 2008, pp. 6165-6173.
Eusebio, et al., "Deep brain stimulation can suppress pathological synchronisation in parkinsonian patients," J Neurol Neurosurg Psychiatry. 82(5): published Oct. 2010, pp. 569-573.
Giannicolam, et al., "The effects of levodopa and ongoing deep brain stimulation on subthalamic beta oscillations in Parkinson's disease," available online Aug. 2010, Exp Neurol. 226(1): pp. 120-127.
Whitmer, et al., "High frequency deep brain stimulation attenuates subthalamic and cortical rhythms in Parkinson's disease," May 2012, Front Hum Neurosci. vol. 6:155, 18 pp.
Little, et al., "Bilateral functional connectivity of the basal ganglia in patients with Parkinson's disease and its modulation by dopaminergic treatment," PLoS One. Dec. 20, 2013;8(12): e82762, 8 pp.
Cagnan, et al., "The relative phases of basal ganglia activities dynamically shape effective connectivity in Parkinson's disease," Brain. Jun. 2015;138(Pt 6): pp. 1667-1678.
Marsden, et al., Coherence between cerebellar thalamus, cortex and muscle in man: cerebellar thalamus interactions. Brain 123 (Pt 7), Feb. 2000, pp. 1459-1470.
Kane, A., et al., Enhanced synchronization of thalamic theta band local field potentials in patients with essential tremor. Exp. Neurol. 217 (1), 171-176, Feb. 2009.
Silberstein et al., "Patterning of globus pallidus local field potentials differs between Parkinson's disease and dystonia," Brain. 126(Pt 12): Aug. 2003, pp. 2597-2608.
Chen, et al., "Neuronal activity in globus pallidus interna can be synchronized to local field potential activity over 3-12 Hz in patients with dystonia," Exp Neurol. 202(2); Aug. 2006, pp. 480-486.
Weinberger, "Oscillatory activity in the globus pallidus internus: comparison between Parkinson's disease and dystonia," Clin Neurophysiol. 123(2): pp. 358-368., Epub Aug. 16, 2011.
Moll, et al., "Asymmetric pallidal neuronal activity in patients with cervical dystonia," Front Syst Neurosci. 8:15, Feb. 11, 2014, 22 pp.
Barow, et al., "Deep brain stimulation suppresses pallidal low frequency activity in patients with phasic dystonic movements," Brain 2014, Sep. 10, 2014, pp. 3012-3024.
Montgomery EB Jr. Effect of subthalamic nucleus stimulation patterns on motor performance in Parkinson's disease. Parkinsonism Relat Disord. May 2005; 11(3): pp. 167-171.
Kuncel, "Tremor reduction and modeled neural activity during cycling thalamic deep brain stimulation" Clin Neurophysiol. May 2012; 123(5): pp. 1044-1052.
Swan, et al., "Short pauses in thalamic deep brain stimulation promote tremor and neuronal bursting," Clin Neurophysiol. Feb. 2016;127(2): pp. 1551-1559.
Birdno MJ, Kuncel AM, Dorval AD, Turner DA, Grill WM. Tremor varies as a function of the temporal regularity of deep brain stimulation. Neuroreport. Mar. 26, 2008;19(5):599-602.
Dorval, et al., "Deep brain stimulation alleviates parkinsonian bradykinesia by regularizing pallidal activity," J Neurophysiol. Aug. 2010;104(2):pp. 911-921.
Birdno, et al., "Stimulus features underlying reduced tremor suppression with temporally patterned deep brain stimulation," J Neurophysiol. Jan. 2012;107(1):pp. 364-383.
Brocker, et al., "Improved efficacy of temporally non-regular deep brain stimulation in Parkinson's disease," Exp Neurol. Jan. 2013 ;239:pp. 60-67.
McConnell, "Failure to suppress low-frequency neuronal oscillatory activity underlies the reduced effectiveness of random patterns of deep brain stimulation," J Neurophysiol. Mar. 2016, pp. 2791-2802.
Baker, et al., "Pallidal stimulation: effect of pattern and rate on bradykinesia in the non-human primate model of Parkinson's disease," Exp Neurol. Oct. 2011 ;231(2):pp. 309-313.
Seeger-Armbruster, et al., "Patterned, but not tonic, optogenetic stimulation in motor thalamus improves reaching in acute drug-induced Parkinsonian rats, " J Neurosci. Jan. 21, 2015;35(3):pp. 1211-1216.
Lentz, et al., "Motor behaviors in the sheep evoked by electrical stimulation of the subthalamic nucleus." Exp Neurol. Nov. 2015 ;273: pp. 69-82.
Tsang, et al., "Subthalamic deep brain stimulation at individualized frequencies for Parkinson disease," Neurology. Jun. 12, 2012;78(24): pp. 1930-1938.
Moro, et al., 2002. "The impact on Parkinson's disease of electrical parameter settings in STN stimulation, " Neurology 59 (5), May 2002, pp. 706-713.
Chen., et al., 2007. "Excessive synchronization of basal ganglia neurons at 20 Hz slows movement in Parkinson's disease" Exp. Neurol. 205 (1), Feb. 2007, pp. 214-221.
Timmermann, MD., et al., Ten-Hertz stimulation of subthalamic nucleus deteriorates motor symptoms in Parkinson's disease. Mov. Disord. 19 (11), pp. 1328-1333, Jun. 2004.
Pedrosa, et al., "Effects of low-frequency thalamic deep brain stimulation in essential tremor patients." Exp. Neurol. 248, Jun. 2013, pp. 205-212.

(56) References Cited

OTHER PUBLICATIONS

Kuncel, et al., "Amplitude- and frequency-dependent changes in neuronal regularity parallel changes in tremor with thalamic deep brain stimulation," IEEE Trans. Neural Syst. Rehabil. Eng. 15 (2), Jun. 2007, pp. 190-197.

Brown, P., et al. "Effects of stimulation of the subthalamic area on oscillatory pallidal activity in Parkinson's disease," Exp. Neurol. 188 (2), Jun. 2004, pp. 480-490.

Eusebio, et al., "Resonance in subthalamo-cortical circuits in Parkinson's disease," Brain. Aug. 2009; 132(Pt 8):2139-50.

International Search Report and Written Opinion of International Application No. PCT/US2018/043227, mailed Dec. 13, 2018, 12 pp.

Lysyansky et al., "Optimal number of stimulation contacts for coordinated reset neuromodulation," Frontiers in Neuroengineering, vol. 6, Article 5, Jul. 22, 2013, 14 pp.

Swan et al., "Investigation of Deep Brain Stimulation Mechanisms During Implantable Pulse Generator Replacement Surgery," Neuromodulation: Technology at the Neural Interface, Neuromodulation 2014, accepted Aug. 27, 2013, 6 pp.

Cao et al., "Research on EEG Phase Amplitude Modulation during Epileptic Seizure", Chinese Journal of Biomedical Engineering, vol. 37, No. 1, Feb. 20, 2018, 33-39 pp., Translation provided for only the Abstract.

First Office Action and Search Report, and translation thereof, from counterpart Chinese Application No. 201880091448.5 dated Jun. 26, 2024, 13 pp.

Second Office Action, and translation thereof, from counterpart Chinese Application No. 201880091448.5 dated Nov. 6, 2024, 9 pp.

\* cited by examiner

NON-CONTINUOUS ELECTRICAL STIMULATION THERAPY

TECHNICAL FIELD

The disclosure relates to medical devices and, more particularly, to medical devices that deliver electrical stimulation therapy.

BACKGROUND

Medical devices may be used to treat a variety of medical conditions. Medical electrical stimulation devices, for example, may deliver electrical stimulation therapy to a patient via implanted electrodes. Electrical stimulation therapy may include stimulation of nerve, muscle, or brain tissue, or other tissue within a patient. An electrical stimulation device may be fully implanted within the patient. For example, an electrical stimulation device may include an implantable electrical stimulation generator and one or more implantable leads carrying electrodes. Alternatively, the electrical stimulation device may comprise a leadless stimulator. In some cases, implantable electrodes may be coupled to an external electrical stimulation generator via one or more percutaneous leads or fully implanted leads.

Patients afflicted with movement disorders or other neurodegenerative impairment, whether by disease or trauma, may experience muscle control and movement problems, such as rigidity, bradykinesia (i.e., slow physical movement), rhythmic hyperkinesia (e.g., tremor), nonrhythmic hyperkinesia (e.g., tics) or akinesia (i.e., a loss of physical movement). Movement disorders may be found in patients with Parkinson's disease, epilepsy, multiple sclerosis, and cerebral palsy, among other conditions. Delivery of electrical stimulation and/or a fluid (e.g., a pharmaceutical drug) by a medical device to one or more sites in a patient, such as a brain, spinal cord, leg muscle or arm muscle, in a patient may help alleviate, and in some cases, eliminate symptoms associated with movement disorders.

SUMMARY

In general, the disclosure relates to systems, devices, and techniques for delivering electrical stimulation via a medical device to the brain of a patient to modify bioelectrical brain signals of the patient. In some examples, the bioelectrical brain signals may oscillate at a frequency that corresponds to pathological brain signals of the patient corresponding to one or more symptoms. In other examples, the frequency of oscillation of such bioelectrical brain signals may correspond to one or more brain states, may correlate with excitation or suppression of a brain network, or may indicate synchronicity with other brain regions. When the biological brain signals of the patient oscillate at such a frequency, a medical device may deliver electrical stimulation (e.g., in the form of pulses or continuous waveform) to the brain at a frequency selected to disrupt the oscillations of the bioelectrical brain activity. For example, the medical device may deliver electrical stimulation that destructively interferes with the oscillations of the bioelectrical brain signals. In other examples, the medical device may deliver electrical stimulation that enhances (e.g., constructively interferes) with oscillations correlated with a favorable brain state. In this manner, the bioelectrical brain signals of the patient may be modulated via the delivered electrical stimulation in a manner that adjusts one or more states of the patient associated with the biological brain signals.

In one example, the disclosure is directed to a method including: sensing, via one or more electrodes, one or more oscillations of a bioelectrical signal of a brain of a patient; and in response to sensing the one or more oscillations: generating, by a medical device, a plurality of bursts of stimulation therapy pulses, the plurality of bursts including an inter-burst frequency selected based on a frequency of the one or more oscillations of the bioelectrical signal; and delivering, by the medical device, the plurality of bursts of stimulation therapy pulses to the patient to modulate a state of the patient associated with the one or more oscillations of the bioelectrical signal.

In another example, the disclosure is directed to a medical system including: one or more electrodes configured to sense one or more oscillations of a bioelectrical signal of a brain of a patient; and a medical device configured to: generate, in response to the sensed one or more oscillations, a plurality of bursts of stimulation therapy pulses, the plurality of bursts including an inter-burst frequency selected based on a frequency of the one or more oscillations of the bioelectrical signal; and deliver the plurality of bursts of stimulation therapy pulses to the patient to modulate a state of the patient associated with the one or more oscillations of the bioelectrical signal.

In another example, the disclosure is directed to a medical system including: means for sensing one or more oscillations of a bioelectrical signal of a brain of a patient; means for generating, in response to sensing the one or more oscillations, a plurality of bursts of stimulation therapy pulses, the plurality of bursts including an inter-burst frequency selected based on a frequency of the one or more oscillations of the bioelectrical signal; and means for delivering the plurality of bursts of stimulation therapy pulses to the patient to modulate a state of the patient associated with the one or more oscillations of the bioelectrical signal.

The details of one or more aspects of the disclosure are set forth in the accompanying drawings and the description below. Other features, objects, and advantages will be apparent from the description and drawings, and from the claims.

BRIEF DESCRIPTION OF THE DRAWINGS

Like reference characters refer to like elements throughout the figures and description.

DETAILED DESCRIPTION

Figure 1:
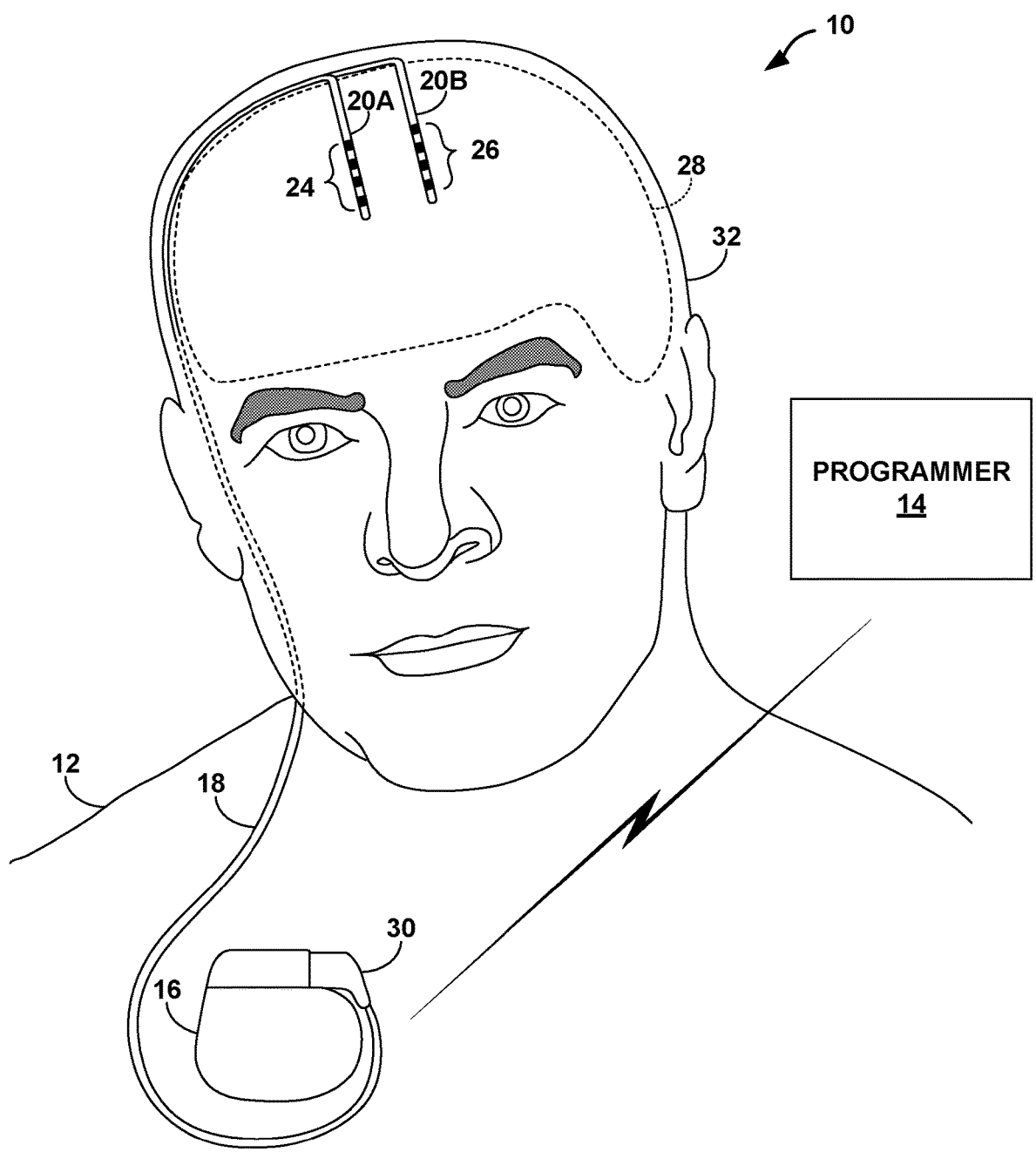
FIG. 1 is a conceptual diagram illustrating an example therapy delivery system.

Systems, devices, and techniques for delivering electrical stimulation via a medical device to the brain of a patient to modulate bioelectrical brain signals of the patient are described. In some examples, the bioelectrical brain signals may oscillate at a frequency that corresponds to pathological brain signals of the patient indicative and/or responsible for symptoms of the patient. In other examples, the bioelectrical brain signals may oscillate at a frequency that corresponds to a certain brain state of the patient, an excitability or suppression of a brain network, or may indicate synchronicity with other brain regions indicative and/or responsible for symptoms of the patient. In one example, when the biological brain signals of the patient oscillate at such a frequency, a medical device may deliver electrical stimulation (e.g., in the form of pulses or continuous waveform) to the brain at a frequency selected to disrupt the bioelectrical brain activity. For example, the medical device may deliver electrical stimulation that destructively interferes with the oscillations of the bioelectrical brain signals. In one example, the medical device may deliver electrical stimulation therapy that comprises an inter-burst frequency selected based on a frequency of the one or more oscillations of the bioelectrical brain signals such that the electrical stimulation modulates the bioelectrical brain signals, thereby modulating the state of the patient associated with the bioelectrical brain signals. For example, the medical device may select an inter-burst frequency based on a frequency of the one or more oscillations such that the electrical stimulation shifts the frequency of the bioelectrical brain signals. In a further example, the medical device may select an inter-burst frequency based on a frequency of the one or more oscillations such that the electrical stimulation alters the relationship between the oscillations of the pathologic bioelectrical brain signals and oscillations of bioelectrical brain signals within other regions of the brain. In this manner, the oscillations in the bioelectrical brain signals of the patient may be reduced or altered, in amplitude and/or frequency, via the delivered electrical stimulation in a manner that suppresses one or more symptoms of a disease of the patient that result from the biological brain signals.

As will be described further below, in some examples, electrical stimulation may be delivered by a medical device to the brain of the patient to manage or otherwise treat one or more symptoms of a patient disorder. The brain of the patient may exhibit brain signals across a broad frequency spectrum. However, in some examples, oscillation of bioelectrical brain signals at a particular frequency or in a frequency band or range may be associated with one or more symptoms or brain states of a patient disorder. An example brain state may include a sleep state of a patient. For example, bioelectrical brain signals oscillating in a particular frequency range may be associated with one or more symptoms of a patient disorder in the sense that such symptoms frequently occur or manifest themselves when the bioelectrical brain signals oscillate at such a frequency range. Such occurrences may be a result of the brain signal oscillations within one or more regions of the brain of a patient interfering with the normal function of that region of the brain. As used herein, a frequency or range of frequencies may be referred to as a pathological frequency or pathological frequency range when oscillations of brain signals at such frequency or frequencies are associated in such a manner with one or more symptoms of a patient disorder. Similarly, bioelectrical brain signals oscillating at one or more pathological frequencies may be referred to as pathological brain signals.

As one example, in the case of Parkinson's disease, beta frequency oscillations (e.g., between approximately 13 Hertz to approximately 30 Hertz) in the subthalamic nucleus (STN), globus pallidus interna (GPi), globus pallidus externa (GPe), and/or other areas of the basal ganglia may be associated with one or more motor symptoms including, e.g., rigidity, akinesia, bradykinesia, dyskinesia, and/or resting tremor. In the case of epilepsy, beta frequency oscillations may occur within one or more sites within the Circuit of Papez, including, e.g., anterior nucleus, internal capsule, cingulate, entorhinal cortex, hippocampus, fornix, mammillary bodies, or mammillothalamic tract (MMT). These motor symptoms may be associated with bioelectrical brain signals oscillating in the beta frequency range in the sense that such symptoms frequently occur when the bioelectrical brain signals oscillate within the beta frequency range. For example, persistence of high amplitude, long duration oscillation in the beta frequency range may result in oscillatory "interference" with normal low amplitude, short duration beta oscillations within the brain. Such interference may limit the normal functions of the above-mentioned regions of the brain. The high amplitude, long duration oscillations of the bioelectrical brain signals may be at a lower frequency than other higher frequency intrinsic signals within the bioelectrical brain signals. Networks of oscillating signals in neurons may be synchronized by electrical and chemical signals that cause the activity of the network to phase lock and resonate at some frequency. In some examples, the symptoms of Parkinson's disease or epilepsy may generally manifest themselves in conjunction with the presence of high amplitude, long duration beta frequency range oscillations (e.g., above some threshold activity level). In some examples, the frequency of symptom manifestations may increase in conjunction with the presence of high amplitude, long duration beta frequency range oscillations. In further examples, gamma oscillations (e.g., oscillations comprising a frequency of about 35 Hertz to 200 Hertz may occur in the hippocampus. Such gamma oscillations may also be associated with one or more symptoms of a patient disorder. In further examples, other high frequency oscillations comprising a frequency within a range of 100 Hertz to 500 Hertz may be associated with one or more symptoms of a patient disorder.

In accordance with the techniques of the disclosure, one or more symptoms of a patient disorder associated with oscillations of bioelectrical brain activity at a particular frequency or frequency band may be treated by reducing or substantially eliminating the oscillation of bioelectrical brain signals at such pathological frequencies when such activity occurs. In some examples, high amplitude, long duration oscillations of bioelectrical brain activity at a particular frequency or frequency band are partially suppressed but bioelectrical brain activity at that particular frequency is not completely reduced or eliminated. For example, the manifestation of one or more symptoms associated with bioelectrical brain signals with high amplitude, long duration oscillation in the beta frequency range for patients with Parkinson disease or epilepsy may be reduced or substantially eliminated by reducing or suppressing high amplitude, long duration oscillations of the pathological brain signals. In another example, the manifestation of one or more symptoms associated with pathological bioelectrical brain signals may be reduced or substantially eliminated by changing the relationship between the pathological bioelectrical brain signals and bioelectrical brain signals of other regions of the brain in a phenomenon known as "phase coupling" or "phase amplitude coupling."

In accordance with some examples, electrical stimulation therapy may be delivered to the brain of a patient via a medical device to disrupt or suppress oscillations of bioelectrical brain signals of the patient. The electrical stimulation therapy may be delivered to the patient to disrupt the bioelectrical brain signals of the patient oscillating at a frequency associated with symptoms of one or more patient disorders. For example, electrical stimulation therapy may be delivered to the brain of a patient via a medical device to destructively interfere with the oscillations of the bioelectrical brain signals. In another example, electrical stimulation therapy may be delivered to the brain of the patient to shift the frequency of the oscillations of the pathological bioelectrical brain signals. In yet another example, electrical stimulation therapy may be delivered to the brain of the patient to shift the amplitude of the oscillations of the pathological bioelectrical brain signals relative to oscillations of other bioelectrical brain signals (e.g., to maintain a specific ration of oscillation amplitudes). In yet another example, electrical stimulation therapy may be delivered to the brain of the patient to shift a time or phase relationship of the oscillations of the pathological bioelectrical brain signals relative to oscillations of other bioelectrical brain signals. The system may continue monitoring the frequency and/or amplitude of the oscillations of the bioelectrical brain signals as feedback and iteratively adjust the electrical stimulation therapy in order to achieve the desired modulation of the sensed oscillations. In this manner, the electrical stimulation therapy may treat or otherwise manage a patient disorder by suppressing the oscillations of bioelectrical brain signals of the patient that are associated with one or more symptoms of a disease of the patient.

To disrupt the oscillations of the bioelectrical brain signals, when bioelectrical brain signals are oscillating at a pathological frequency (which may refer to a frequency associated with the manifestation of one or more symptoms of a patient disorder), electrical stimulation therapy may be generated and delivered to the brain of a patient to destructively interfere with the bioelectrical brain signals so as to cancel out the bioelectrical brain signals with the electrical stimulation therapy.

In some examples, the electrical stimulation may be delivered at substantially the same frequency as that of bioelectrical brain signal oscillations but out of phase with the bioelectrical brain signal oscillations. In other examples, the electrical stimulation therapy may be delivered a slightly different frequency than the bioelectrical brain signal oscillations such that the delivered frequency provides pulses generally out of phase of the bioelectric brain signals. For example, where a frequency of a peak Beta oscillation of a bioelectrical brain signal is about 27 Hertz, a medical device may deliver a plurality of electrical stimulation pulses at a pulse frequency of about 17 Hertz or about 20 Hertz. By delivering the plurality of electrical stimulation pulses at a slightly different frequency than the bioelectrical brain signal oscillations, the electrical stimulation pulses may entrain the oscillations of the bioelectrical brain signal at the electrical stimulation frequency a majority of the time. In such a case, while the pulses (for electrical stimulation comprising a plurality of electrical stimulation pulses) or waveform peaks (for electrical stimulation comprising a continuous waveform or sinusoid) of the electrical stimulation may not substantially be in phase or out of phase with all peaks of the oscillations of the bioelectrical brain signal at the given frequency, the electrical stimulation may disrupt (e.g., destructively interfere with) at least a portion of the peaks of the oscillations of the bioelectrical brain signal. Conversely, electrical stimulation may be delivered at the same frequency as oscillations of a bioelectrical signal that correspond to beneficial effects on the patient or a favorable brain state. As an example, if oscillations of a bioelectrical brain signal correspond to a favorable brain state such as high quality sleep, a medical device may deliver electrical stimulation comprising a frequency, phase, or timing so as to constructively interfere with the oscillations of the bioelectrical brain signal, thereby reinforcing the associated favorable brain or physiological state (e.g., high quality sleep).

To treat or otherwise manage a patient disorder, the electrical stimulation may disrupt or suppress the oscillations in the electrical signals of the brain by destructively interfering with the oscillations. For example, the frequency of the electrical stimulation may be adjusted to approximate the oscillation frequency of the bioelectrical brain signals, but offset from the oscillation frequency of the bioelectrical brain signals by a phase amount. In some examples, the frequency of the electrical stimulation is offset from the oscillation frequency of the bioelectrical brain signals by a phase amount greater than 120 degrees and less than 240 degrees (e.g., such as about 180 degrees or about π radians). In this fashion, the electrical stimulation may destructively interfere with oscillations in electrical signals of the brain such that the tissue of the brain of the patient is subjected to a combined electrical signal comprising an amplitude that is less than either an amplitude of the oscillations in the electrical signals of the brain or an amplitude of the electrical stimulation alone. It is recognized that the closer the phase of the electrical stimulation is to 180 degrees or π radians out of phase with the phase of the oscillations of the bioelectrical signals, the greater the reduction in the amplitude of the bioelectrical signal experienced by a local tissue site of the brain. Accordingly, by suppressing or reducing the amplitude of pathological oscillations in the electrical signals of the brain in accordance with the techniques described herein, the medical system may suppress or reduce the severity, frequency, or duration of one or more symptoms of a disease of the patient associated with the pathological oscillations in the electrical signals of the brain. Conversely, electrical stimulation may be delivered generally in phase with oscillations of a bioelectrical signal that correspond to beneficial effects on the patient. As an example, if oscillations of a bioelectrical brain signal correspond to a favorable brain state such as high quality sleep, a medical device may deliver electrical stimulation comprising a phase offset of less than 120 degrees, either leading or lagging behind the oscillations of the bioelectrical signal, so as to constructively interfere with the oscillations of the bioelectrical brain signal, thereby reinforcing the associated favorable brain or physiological state (e.g., high quality sleep).

FIG. 1 is a conceptual diagram illustrating an example therapy system 10 in accordance with examples of the disclosure. In FIG. 1, example therapy system 10 may deliver electrical stimulation therapy to treat or otherwise manage a patient condition, such as, e.g., a movement disorder of patient 12. One example of a movement disorder treated by the delivery of DBS via system 10 may include Parkinson's disease or epilepsy. Patient 12 ordinarily will be a human patient. In some cases, however, therapy system 10 may be applied to other mammalian or non-mammalian non-human patients.

For ease of illustration, examples of the disclosure will primarily be described with regard to the treatment of movement disorders and, in particular, the treatment of Parkinson's disease, e.g., by reducing or preventing the manifestation of symptoms exhibited by patients suffering from Parkinson's disease. As noted above, such symptoms may include rigidity, akinesia, bradykinesia, dyskinesia, and/or resting tremor. However, the treatment of one or more patient disorders other than that of Parkinson's disease by employing the techniques described herein is contemplated. For example, the described techniques may be employed to manage or other treat symptoms of other patient disorders, such as, but not limited to, epilepsy, psychological disorders, mood disorders, seizure disorders or other neurogenerative impairment. In one example, such techniques may be employed to provide therapy to patient to manage Alzheimer's disease.

Therapy system 10 includes medical device programmer 14, implantable medical device (IMD) 16, lead extension 18, and one or more leads 20A and 20B (collectively "leads 20) with respective sets of electrodes 24, 26. IMD 16 includes stimulation therapy circuitry that includes a stimulation generator that generates and delivers electrical stimulation therapy to one or more regions of brain 28 of patient 12 via a subset of electrodes 24, 26 of leads 20A and 20B, respectively. In the example shown in FIG. 1, therapy system 10 may be referred to as a deep brain stimulation (DBS) system because IMD 16 provides electrical stimulation therapy directly to tissue within brain 28, e.g., a tissue site under the dura mater of brain 28. In other examples, leads 20 may be positioned to deliver therapy to a surface of brain 28 (e.g., the cortical surface of brain 28).

In some examples, delivery of stimulation to one or more regions of brain 28, such as an anterior nucleus (AN), thalamus or cortex of brain 28, provides an effective treatment to manage a disorder of patient 12. In some examples, IMD 16 may provide cortical stimulation therapy to patient 12, e.g., by delivering electrical stimulation to one or more tissue sites in the cortex of brain 28. In cases in which IMD 16 delivers electrical stimulation to brain 28 to treat Parkinson's disease by modulating brain signals oscillating at pathological frequencies, target stimulation sites may include one or more basal ganglia sites, including, e.g., subthalamic nucleus (STN), globus pallidus interna (GPi), globus pallidus externa (GPe), pedunculopontine nucleus (PPN), thalamus, substantia nigra pars reticulata (SNr), internal capsule, and/or motor cortex. In cases in which IMD 16 delivers electrical stimulation to brain 28 to treat epilepsy by modulating brain signals oscillating at pathological frequencies, target stimulation sites may include one or more sites within the Circuit of Papez, including, e.g., anterior nucleus, internal capsule, cingulate, entorhinal cortex, hippocampus, fornix, mammillary bodies, or MMT. Brain signals with oscillations in the beta frequency range may be considered pathological brain signals. As will be described below, IMD 16 may deliver electrical stimulation selected to disrupt or suppress pathological bioelectrical brain signals oscillating within a pathological frequency range, promote beneficial bioelectrical brain signals, or change a relationship between oscillations of two or more bioelectrical brain signals. In one example, the pathological frequency range is a Beta frequency range of about 11 Hertz to about 35 Hertz. For instances in which IMD 16 senses the bioelectrical brain signals at one or more sites of brain 28 to detection oscillations at a pathological frequency, the target stimulation site(s) for electrical stimulation delivered to brain 28 of patient 28 may be the same and/or different than the sensing site.

In the example shown in FIG. 1, IMD 16 may be implanted within a subcutaneous pocket above the clavicle of patient 12. In other examples, IMD 16 may be implanted within other regions of patient 12, such as a subcutaneous pocket in the abdomen or buttocks of patient 12 or proximate the cranium of patient 12. Implanted lead extension 18 is coupled to IMD 16 via connector block 30 (also referred to as a header), which may include, for example, electrical contacts that electrically couple to respective electrical contacts on lead extension 18. The electrical contacts electrically couple the electrodes 24, 26 carried by leads 20 to IMD 16. Lead extension 18 traverses from the implant site of IMD 16 within a chest cavity of patient 12, along the neck of patient 12 and through the cranium of patient 12 to access brain 28. Generally, IMD 16 is constructed of a biocompatible material that resists corrosion and degradation from bodily fluids. IMD 16 may comprise a hermetic housing 34 to substantially enclose components, such as a processor, therapy circuitry, and memory.

Leads 20A and 20B may be implanted within the right and left hemispheres, respectively, of brain 28 in order deliver electrical stimulation to one or more regions of brain 28, which may be selected based on many factors, such as the type of patient condition for which therapy system 10 is implemented to manage. Other implant sites for leads 20 and IMD 16 are contemplated. For example, IMD 16 may be implanted on or within cranium 32 or leads 20 may be implanted within the same hemisphere or IMD 16 may be coupled to a single lead that is implanted in one or both hemispheres of brain 28.

Leads 20 may be positioned to deliver electrical stimulation to one or more target tissue sites within brain 28 to manage patient symptoms associated with a disorder of patient 12. Leads 20 may be implanted to position electrodes 24, 26 at desired locations of brain 28 through respective holes in cranium 32. Leads 20 may be placed at any location within brain 28 such that electrodes 24, 26 are capable of providing electrical stimulation to target tissue sites within brain 28 during treatment. For example, in the case of Parkinson's disease, for example, leads 20 may be implanted to deliver electrical stimulation to one or more basal ganglia sites, including, e.g., subthalamic nucleus (STN), globus pallidus interna (GPi), globus pallidus externa (GPe), pedunculopontine nucleus (PPN), thalamus, substantia nigra pars reticulata (SNr), internal capsule, and/or motor cortex. As another example, in the case of epilepsy, for example, leads 20 may be implanted to deliver electrical stimulation to one or more sites within the Circuit of Papez, including, e.g., anterior nucleus, internal capsule, cingulate, entorhinal cortex, hippocampus, fornix, mammillary bodies, or MMT.

Although leads 20 are shown in FIG. 1 as being coupled to a common lead extension 18, in other examples, leads 20 may be coupled to IMD 16 via separate lead extensions or directly coupled to IMD 16. Moreover, although FIG. 1 illustrates system 10 as including two leads 20A and 20B coupled to IMD 16 via lead extension 18, in some examples, system 10 may include one lead or more than two leads.

Leads 20 may deliver electrical stimulation to treat any number of neurological disorders or diseases in addition to movement disorders, such as seizure disorders or psychiatric disorders. Examples of movement disorders include a reduction in muscle control, motion impairment or other movement problems, such as rigidity, bradykinesia, rhythmic hyperkinesia, nonrhythmic hyperkinesia, dystonia, tremor, and akinesia. Movement disorders may be associated with patient disease states, such as Parkinson's disease, Huntington's disease, or epilepsy. Examples of psychiatric disorders include MDD, bipolar disorder, anxiety disorders, post traumatic stress disorder, dysthymic disorder, and OCD. As described above, while examples of the disclosure are primarily described with regard to treating Parkinson's disease, treatment of other patient disorders via delivery of therapy to brain 28 is contemplated.

Leads 20 may be implanted within a desired location of brain 28 via any suitable technique, such as through respective burr holes in a skull of patient 12 or through a common burr hole in the cranium 32. Leads 20 may be placed at any location within brain 28 such that electrodes 24, 26 of leads 20 are capable of providing electrical stimulation to targeted tissue during treatment. Electrical stimulation generated from the stimulation generator (not shown) within the therapy circuitry of IMD 16 may help prevent the onset of events associated with the patient's disorder or mitigate symptoms of the disorder. For example, electrical stimulation delivered by IMD 16 to a target tissue site within brain 28 may have a frequency (and/or other stimulation parameter values) selected to suppress or disrupt bioelectrical brain signals oscillating at a pathological frequency. In this manner, IMD 16 may deliver electrical stimulation to reduce or prevent the onset of events associated with the patient's disorder or mitigate symptoms of the disorder.

In the examples shown in FIG. 1, electrodes 24, 26 of leads 20 are shown as ring electrodes. Ring electrodes may be relatively easy to program and are typically capable of delivering an electrical field to any tissue adjacent to leads 20. In other examples, electrodes 24, 26 of leads 20 may have different configurations. For example, electrodes 24, 26 of leads 20 may have a complex electrode array geometry that is capable of producing shaped electrical fields. The complex electrode array geometry may include multiple electrodes (e.g., partial ring or segmented electrodes) around the perimeter of each lead 20, rather than a ring electrode. In this manner, electrical stimulation may be directed to a specific direction from leads 20 to enhance therapy efficacy and reduce possible adverse side effects from stimulating a large volume of tissue. In some examples, a lead may include one or more ring electrodes together with one or more rings of segmented electrodes.

In some examples, outer housing 34 of IMD 16 may include one or more stimulation and/or sensing electrodes. For example, housing 34 can comprise an electrically conductive material that is exposed to tissue of patient 12 when IMD 16 is implanted in patient 12, or an electrode can be attached to housing 34. In alternative examples, leads 20 may have shapes other than elongated cylinders as shown in FIG. 1. For example, leads 20 may be paddle leads, spherical leads, bendable leads, or any other type of shape effective in treating patient 12.

IMD 16 may deliver electrical stimulation therapy to brain 28 of patient 12 according to one or more stimulation therapy programs. A therapy program may define one or more electrical stimulation parameter values for therapy generated and delivered from IMD 16 to brain 28 of patient 12. Where IMD 16 delivers electrical stimulation in the form of electrical pulses, for example, the stimulation therapy may be characterized by selected pulse parameters, such as pulse amplitude, pulse rate or frequency, pulse width, or number of pulses. Where IMD 16 delivers electrical stimulation in the form of a sinusoidal wave, for example, the stimulation therapy may be characterized by selected sinusoidal parameters, such as amplitude or cycle frequency. In addition, if different electrodes are available for delivery of stimulation, the therapy may be further characterized by different electrode combinations, which can include selected electrodes and their respective polarities. The exact therapy parameter values of the stimulation therapy that helps manage or treat a patient disorder may be specific for the particular target stimulation site (e.g., the region of the brain) involved as well as the particular patient and patient condition.

In addition to delivering therapy to manage a disorder of patient 12, therapy system 10 monitors one or more bioelectrical brain signals of patient 12. For example, IMD 16 may include sensing circuitry that senses bioelectrical brain signals within one or more regions of brain 28. In the example shown in FIG. 1, the signals generated by electrodes 24, 26 are conducted to the sensing circuitry within IMD 16 via conductors within the respective lead 20A, 20B. As described in further detail below, in some examples, processing circuitry of IMD 16 may sense the bioelectrical signals within brain 28 of patient 12 and controls delivery of electrical stimulation therapy to brain 28 via electrodes 24, 26 when the bioelectrical brain signals are oscillating at a pathological frequency.

In some examples, the sensing circuitry of IMD 16 may receive the bioelectrical signals from electrodes 24, 26 or other electrodes positioned to monitored brain signals of patient 12. Electrodes 24, 26 may also be used to deliver electrical stimulation from the therapy circuitry to target sites within brain 28 as well as sense brain signals within brain 28. However, IMD 16 can also use separate sensing electrodes to sense the bioelectrical brain signals. In some examples, the sensing circuitry of IMD 16 may sense bioelectrical brain signals via one or more of the electrodes 24, 26 that are also used to deliver electrical stimulation to brain 28. In other examples, one or more of electrodes 24, 26 may be used to sense bioelectrical brain signals while one or more different electrodes 24, 26 may be used to deliver electrical stimulation.

Depending on the particular stimulation electrodes and sense electrodes used by IMD 16, IMD 16 may monitor brain signals and deliver electrical stimulation at the same region of brain 28 or at different regions of brain 28. In some examples, the electrodes used to sense bioelectrical brain signals may be located on the same lead used to deliver electrical stimulation, while in other examples, the electrodes used to sense bioelectrical brain signals may be located on a different lead than the electrodes used to deliver electrical stimulation. In some examples, a brain signal of patient 12 may be monitored with external electrodes, e.g., scalp electrodes. Moreover, in some examples, the sensing circuitry that senses bioelectrical brain signals of brain 28 (e.g., the sensing circuitry that generates an electrical signal indicative of the activity within brain 28) is in a physically separate housing from outer housing 34 of IMD 16. However, in the example shown in FIG. 1 and the example primarily referred to herein for ease of description, the sensing circuitry and therapy circuitry of IMD 16 are enclosed within a common outer housing 34.

The bioelectrical brain signals monitored by IMD 16 may reflect changes in electrical current produced by the sum of electrical potential differences across brain tissue. Examples of the monitored bioelectrical brain signals include, but are not limited to, an electroencephalogram (EEG) signal, an electrocorticogram (ECoG) signal, a local field potential (LFP) sensed from within one or more regions of a patient's brain, action potentials from single cells within the patient's brain, and/or Microelectrode recording (MER) of single cells within the patient's brain.

External programmer 14 wirelessly communicates with IMD 16 as needed to provide or retrieve therapy information. Programmer 14 is an external computing device that the user, e.g., the clinician and/or patient 12, may use to communicate with IMD 16. For example, programmer 14 may be a clinician programmer that the clinician uses to communicate with IMD 16 and program one or more therapy programs for IMD 16. Alternatively, programmer 14 may be a patient programmer that allows patient 12 to select programs and/or view and modify therapy parameters. The clinician programmer may include more programming features than the patient programmer. In other words, more complex or sensitive tasks may only be allowed by the clinician programmer to prevent an untrained patient from making undesired changes to IMD 16.

Programmer 14 may be a hand-held computing device with a display viewable by the user and an interface for providing input to programmer 14 (i.e., a user input mechanism). For example, programmer 14 may include a small display screen (e.g., a liquid crystal display (LCD) or a light emitting diode (LED) display) that presents information to the user. In addition, programmer 14 may include a touch screen display, keypad, buttons, a peripheral pointing device or another input mechanism that allows the user to navigate through the user interface of programmer 14 and provide input. If programmer 14 includes buttons and a keypad, the buttons may be dedicated to performing a certain function, i.e., a power button, or the buttons and the keypad may be soft keys that change in function depending upon the section of the user interface currently viewed by the user.

In other examples, programmer 14 may be a larger workstation or a separate application within another multi-function device, rather than a dedicated computing device. For example, the multi-function device may be a notebook computer, tablet computer, workstation, cellular phone, personal digital assistant or another computing device that may run an application that enables the computing device to operate as a secure medical device programmer 14. A wireless adapter coupled to the computing device may enable secure communication between the computing device and IMD 16.

When programmer 14 is configured for use by the clinician, programmer 14 may be used to transmit initial programming information to IMD 16. This initial information may include hardware information, such as the type of leads 20, the arrangement of electrodes 24, 26 on leads 20, the position of leads 20 within brain 28, initial programs defining therapy parameter values, and any other information that may be useful for programming into IMD 16. Programmer 14 may also be capable of completing functional tests (e.g., measuring the impedance of electrodes 24, 26 of leads 20).

The clinician may also store therapy programs within IMD 16 with the aid of programmer 14. During a programming session, the clinician may determine one or more therapy programs that may provide efficacious therapy to patient 12 to address symptoms associated with the seizure disorder (or other patient condition). For example, the clinician may select one or more electrode combinations with which stimulation is delivered to brain 28. During the programming session, patient 12 may provide feedback to the clinician as to the efficacy of the specific program being evaluated or the clinician may evaluate the efficacy based on one or more physiological parameters of patient (e.g., heart rate, respiratory rate or muscle activity). Programmer 14 may assist the clinician in the creation/identification of therapy programs by providing a methodical system for identifying potentially beneficial therapy parameter values.

Programmer 14 may also be configured for use by patient 12. When configured as a patient programmer, programmer 14 may have limited functionality (compared to a clinician programmer) in order to prevent patient 12 from altering critical functions of IMD 16 or applications that may be detrimental to patient 12. In this manner, programmer 14 may only allow patient 12 to adjust values for certain therapy parameters or set an available range of values for a particular therapy parameter.

Programmer 14 may also provide an indication to patient 12 when therapy is being delivered, when patient input has triggered a change in therapy or when the power source within programmer 14 or IMD 16 needs to be replaced or recharged. For example, programmer 14 may include an alert LED, may flash a message to patient 12 via a programmer display, generate an audible sound or somatosensory cue to confirm patient input was received, e.g., to indicate a patient state or to manually modify a therapy parameter.

Whether programmer 14 is configured for clinician or patient use, programmer 14 is configured to communicate to IMD 16 and, optionally, another computing device, via wireless communication. Programmer 14, for example, may communicate via wireless communication with IMD 16 using radio frequency (RF) telemetry techniques known in the art. Programmer 14 may also communicate with another programmer or computing device via a wired or wireless connection using any of a variety of local wireless communication techniques, such as RF communication according to the 802.11 or Bluetooth specification sets, infrared (IR) communication according to the IRDA specification set, or other standard or proprietary telemetry protocols. Programmer 14 may also communicate with other programming or computing devices via exchange of removable media, such as magnetic or optical disks, memory cards or memory sticks. Further, programmer 14 may communicate with IMD 16 and another programmer via remote telemetry techniques known in the art, communicating via a local area network (LAN), wide area network (WAN), public switched telephone network (PSTN), or cellular telephone network, for example.

Therapy system 10 may be implemented to provide chronic stimulation therapy to patient 12 over the course of several months or years. However, system 10 may also be employed on a trial basis to evaluate therapy before committing to full implantation. If implemented temporarily, some components of system 10 may not be implanted within patient 12. For example, patient 12 may be fitted with an external medical device, such as a trial stimulator, rather than IMD 16. The external medical device may be coupled to percutaneous leads or to implanted leads via a percutaneous extension. If the trial stimulator indicates DBS system 10 provides effective treatment to patient 12, the clinician may implant a chronic stimulator within patient 12 for relatively long-term treatment.

In accordance with the techniques of the disclosure, IMD 16 senses, via electrodes 24, 26 disposed along leads 20, one or more bioelectrical brain signals of brain 28 of patient 12. In some examples, IMD 16 senses one or more oscillations of the bioelectrical brain signals oscillating at a frequency associated with a pathological disease. In some examples, the one or more oscillations are within a Beta frequency range of about 11 Hertz to about 35 Hertz. In other examples, the one or more oscillations are within a Theta frequency band of about 4 Hertz to about 12 Hertz. In other examples, the one or more oscillations are within a Gamma frequency band of between about 35 Hertz to about 200 Hertz. In some examples, the one or more oscillations are associated with one or more symptoms of Parkinson's disease, such as tremor, rigidity, or bradykinesia, etc. In some examples, the one or more oscillations are associated with one or more symptoms of another disease, such as dystonia, essential tremor, Tourette's syndrome, obsessive compulsive disorder, epilepsy, or depression.

In response to sensing the one or more oscillations, in one example IMD 16 generates electrical stimulation comprising a frequency approximating that of the one or more oscillations and out of phase with the one or more oscillations. In other examples, IMD 16 generates electrical stimulation comprising a frequency that is different from that of the one or more oscillations and out of phase with the one or more oscillations such that the electrical stimulation inter-burst frequency is different from the oscillations and occurs substantially out of phase with the frequency of the oscillations of the brain signals. In some examples, the electrical stimulation comprises a waveform approximating that of the one or more oscillations, but at least partially out of phase from the oscillations. In some examples, the waveform comprises regularly-spaced electrical stimulation pulses, regular bursts of electrical stimulation pulses, or irregular patterns of electrical stimulation. In such examples, IMD 16 delivers the bursts or patterns in the frequency and phase relationships to the oscillations of the bioelectrical signal of interest as described above. Further, IMD 16 delivers the electrical stimulation via electrodes 24, 26 disposed along leads 20 to brain 28.

As described herein, burst electrical stimulation describes a type of electrical stimulation comprising a first period of time wherein electrical stimulation is delivered as two or more closely spaced electrical stimulation pulses (e.g., a "burst" of one or more electrical stimulation pulses) and a period of time in which electrical stimulation is not delivered. Each "burst" of electrical stimulation comprises closely spaced electrical stimulation pulses. Burst electrical stimulation typically may be defined by an intra-burst frequency (e.g., a frequency of each of the one or more electrical stimulation pulses that make up the "burst") and an inter-burst frequency (e.g., a frequency of each of the bursts of stimulation). In some examples of the techniques disclosed herein, a medical device, such as IMD 16, delivers electrical stimulation therapy as a burst of electrical stimulation. In alternative examples of the techniques disclosed herein, instead of delivering a burst of electrical stimulation, a medical device such as IMD 16 may deliver a single electrical stimulation pulse.

In an example wherein IMD 16 delivers electrical stimulation in the form of a sinusoidal wave, IMD 16 may sense one or more oscillations of a bioelectrical brain signal at a frequency of about 27 Hertz. Such oscillations of the bioelectrical brain signal lies within the Beta frequency range and may be associated with the presence of one or more symptoms of Parkinson's disease. In this example, IMD 16 generates electrical stimulation at 27 Hertz and 180 degrees (e.g., $\pi$ radians) out of phase with the one or more sensed oscillations and delivers the electrical stimulation to a tissue site of brain 28 so as to disrupt or suppress the one or more oscillations by destructively interfering with the one or more oscillations. While in some examples, IMD 16 may generate electrical stimulation that is out of phase with the one or more sensed oscillations by an amount other than 180 degrees (e.g., $\pi$ radians), the closer the phase of the electrical stimulation is to 180 degrees or $\pi$ radians out of phase with the phase of the one or more sensed oscillations, the greater the reduction in the amplitude of the bioelectrical signal experienced by a local tissue site of the brain. Conversely, IMD 16 may generate electrical stimulation that is out of phase with the one or more sensed oscillations by an amount less than 180 degrees to promote a desirable oscillation of a bioelectrical brain signal or favorable brain state (e.g., such as high quality sleep).

In one example wherein IMD 16 delivers electrical stimulation in the form of electrical pulses, IMD 16 may sense one or more oscillations of a pathologic bioelectrical brain signal at a frequency of about 27 Hertz. In this example, IMD 16 generates a plurality of electrical stimulation pulses and delivers the electrical stimulation pulses at a pulse frequency that is slightly less than that of the one or more oscillations, e.g., at 17 Hertz or 20 Hertz and 180 degrees (e.g., $\pi$ radians) out of phase with the one or more oscillations. IMD 16 delivers the electrical stimulation pulses to a tissue site of brain 28 so as to entrain the one or more pathologic oscillations to the frequency of the electrical stimulation. In some examples, the plurality of electrical stimulation pulses may include about 3 or 4 pulses. By delivering a limited number of pulses, system 16 may substantially avoid delivering electrical stimulation pulses that form a beat frequency with the one or more oscillations of the bioelectrical brain signal, which may cause constructive interference with the one or more oscillations of the pathologic bioelectrical brain signal. In such a case, while the electrical stimulation pulses may not substantially be in phase or out of phase with all peaks of the oscillations of the bioelectrical brain signal at the given frequency, the electrical stimulation may disrupt (e.g., destructively interfere with) at least a portion of the peaks of the oscillations of the bioelectrical brain signal a majority of the time. In some examples, modulating or shifting the frequency of the one or more pathologic oscillations may adjust or alter a relationship between the oscillations of the pathologic bioelectrical brain signals and oscillations of bioelectrical brain signals within other regions of the brain such that in a manner that suppresses one or more symptoms of a disease of the patient that result from the relationship.

Because the electrical stimulation is out of phase with the one or more oscillations of the bioelectrical brain signals of brain 28, the electrical stimulation generally destructively interferes with the one or more oscillations. This may reduce the amplitude of the one or more oscillations experienced at local tissue regions of brain 28. By reducing the amplitude of the one or more oscillations of the bioelectrical brain signals of brain 28 associated with the pathological disease, system 10 may suppress or reduce the symptoms of the pathological disease of patient 12.

It is recognized that, in order for the electrical stimulation to cause destructive interference with the one or more oscillations of the bioelectrical brain signals of brain 28, the electrical stimulation should be out of phase from the one or more oscillations by a phase amount greater than 120 degrees and less than 240 degrees (e.g., such as about 180 degrees), or by a phase amount greater than $2\pi/3$ radians and less than $4\pi/3$ radians (e.g., such as about $\pi$ radians). It is further recognized that delivering the electrical stimulation at about the same frequency as the one or more oscillations and about 180 degrees ($\pi$ radians) out of phase with the one or more oscillations may substantially or entirely negate the amplitude of the one or more oscillations of the bioelectrical brain signals of brain 28. Further, it is noted that delivering the electrical stimulation in phase with the one or more oscillations of the bioelectrical brain signals of brain 28 (e.g., a phase amount in a range from about 0 degrees to 120 degrees, a range from about 240 degrees to about 360 degrees, a range from about 0 radians to about $2\pi/3$ radians, or a range of about $4\pi/3$ radians to $2\pi$ radians) may cause constructive interference with the one or more oscillations and may be avoided, if the goal is to suppress pathologic oscillations, or may be favored if the goal is to promote desirable oscillations.

In the foregoing examples, IMD 10 delivers electrical stimulation therapy comprising an inter-burst frequency selected based on a frequency of the one or more oscillations of the bioelectrical brain signals of patient 12. However, in other examples, instead of electrical stimulation therapy, IMD 10 may deliver other types of therapy. For example, IMD 10 may deliver light pulses (e.g., optogenetic therapy) comprising a frequency selected based on a frequency of the one or more oscillations of the bioelectrical brain signals of patient 12. In still further examples, IMD 10 may deliver ultrasound waves comprising a frequency selected based on a frequency of the one or more oscillations of the bioelectrical brain signals of patient 12.

Figure 2:
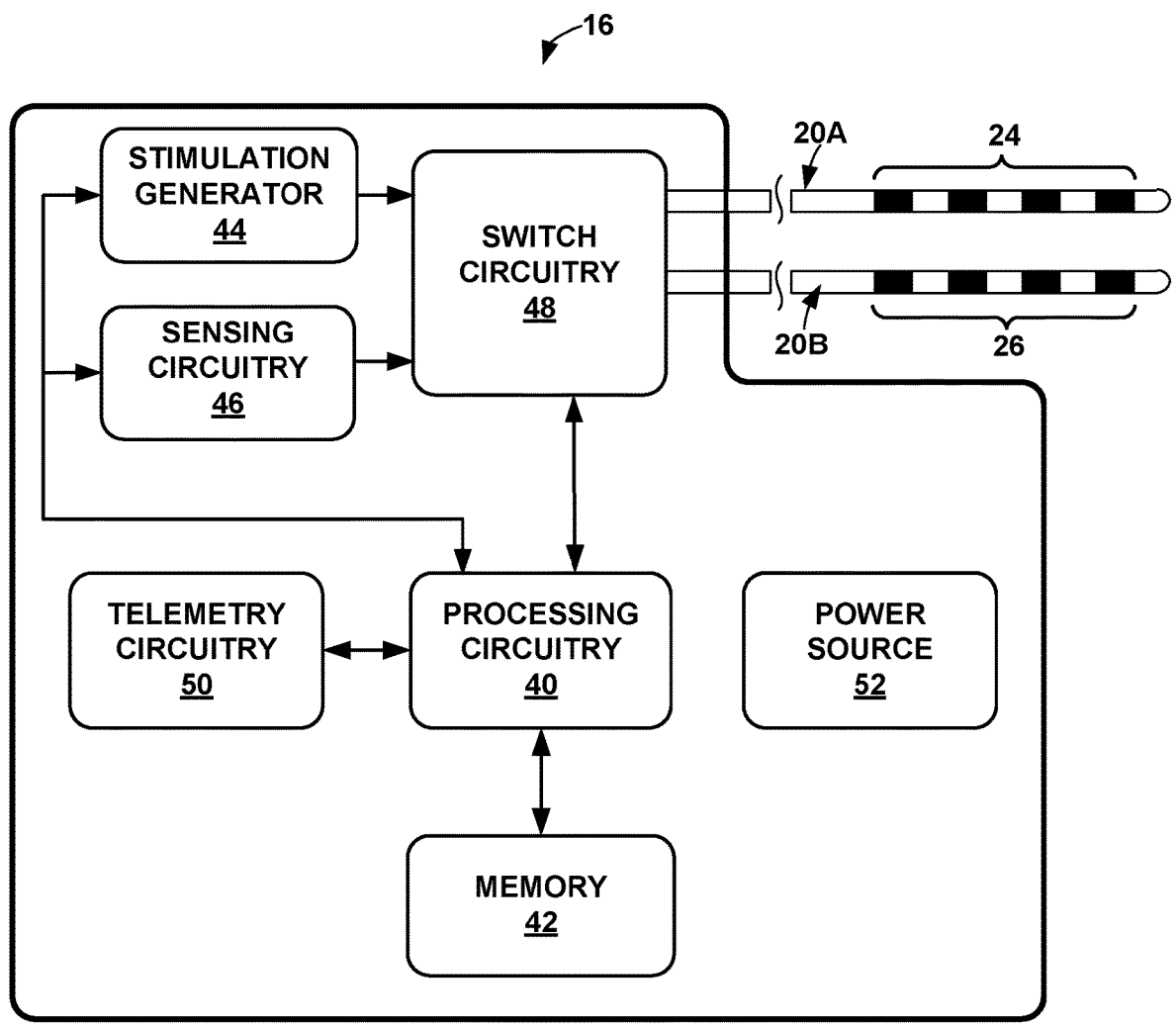
FIG. 2 is functional block diagram illustrating components of an example medical device.

FIG. 2 is a functional block diagram illustrating components of an example IMD 16. In the example shown in FIG. 2, IMD 16 includes memory 42, processing circuitry 40, stimulation generator 44, sensing circuitry 46, switch circuitry 48, telemetry circuitry 50, and power source 52. Processing circuitry 40 may include any one or more microprocessors, controllers, digital signal processors (DSPs), application specific integrated circuits (ASICs), field-programmable gate arrays (FPGAs), discrete logic circuitry, or other processing circuitry. The functions attributed to processors described herein, including processing circuitry 40, may be provided by a hardware device and embodied as software, firmware, hardware, or any combination thereof.

In the example shown in FIG. 2, sensing circuitry 46 senses bioelectrical brain signals of patient 12 via select combinations of electrodes 24, 26. Sensing circuitry 46 may include circuitry that measures the electrical activity of a particular region, e.g., an anterior nucleus, thalamus or cortex of brain 24 via select electrodes 24, 26. For treatment of Parkinson's disease, sensing circuitry 46 may be configured to measure the electrical activity of the subthalamic nucleus (STN), globus pallidus interna (GPi), globus pallidus externa (GPe), and/or other areas of the basal ganglia. For treatment of epilepsy, sensing circuitry 46 may be configured to measure the electrical activity of the one or more sites within the Circuit of Papez, including, e.g., anterior nucleus, internal capsule, cingulate, entorhinal cortex, hippocampus, fornix, mammillary bodies, or MMT Sensing circuitry 46 may sample the bioelectrical brain signal substantially continuously or at regular intervals, such as, but not limited to, a frequency of about 1 Hertz to about 1000 Hertz, such as about 250 Hertz to about 1000 Hertz or about 500 Hertz to about 1000 Hertz. Sensing circuitry 46 includes circuitry for determining a voltage difference between two electrodes 24, 26, which generally indicates the electrical activity within the particular region of brain 24. One of the electrodes 24, 26 may act as a reference electrode, and, if sensing circuitry 46 is implanted within patient 12, a housing of IMD 16 or the sensing circuitry in examples in which sensing circuitry 46 is separate from IMD 16, may include one or more electrodes that may be used to sense bioelectrical brain signals.

The output of sensing circuitry 46 may be received by processing circuitry 40. In some cases, processing circuitry 40 may apply additional processing to the bioelectrical signals, e.g., convert the output to digital values for processing and/or amplify the bioelectrical brain signal. In addition, in some examples, sensing circuitry 46 or processing circuitry 40 may filter the signal from the selected electrodes 24, 26 in order to remove undesirable artifacts from the signal, such as noise from cardiac signals generated within the body of patient 12. Although sensing circuitry 46 is incorporated into a common outer housing with stimulation generator 44 and processing circuitry 40 in FIG. 2, in other examples, sensing circuitry 46 is in a separate outer housing from the outer housing of IMD 16 and communicates with processing circuitry 40 via wired or wireless communication techniques. In other examples, a bioelectrical brain signal may be sensed via external electrodes (e.g., scalp electrodes).

In some examples, sensing circuitry 46 may include circuitry to tune to and extract a power level of a particular frequency band of a sensed brain signal. Thus, the power level of a particular frequency band of a sensed brain signal may be extracted prior to digitization of the signal by processing circuitry 40. By tuning to and extracting the power level of a particular frequency band before the signal is digitized, it may be possible to run frequency domain analysis algorithms at a relatively slower rate compared to systems that do not include a circuit to extract a power level of a particular frequency band of a sensed brain signal prior to digitization of the signal. In some examples, sensing circuitry 46 may include more than one channel to monitor simultaneous activity in different frequency bands, i.e., to extract the power level of more than one frequency band of a sensed brain signal. These frequency bands may include an alpha frequency band (e.g., 8 Hertz to 12 Hertz, beta frequency band (e.g., approximately 12 Hertz to approximately 35 Hertz), gamma frequency band (e.g., between approximately 35 Hertz to approximately 200 Hertz), or other frequency bands.

In some examples, sensing circuitry 46 may include an architecture that merges chopper-stabilization with heterodyne signal processing to support a low-noise amplifier. In some examples, sensing circuitry 46 may include a frequency selective signal monitor that includes a chopper-stabilized superheterodyne instrumentation amplifier and a signal analysis unit. Example amplifiers that may be included in the frequency selective signal monitor are described in further detail in commonly-assigned U.S. Patent Publication No. 2009/0082691 to Denison et al., entitled, "FREQUENCY SELECTIVE MONITORING OF PHYSIOLOGICAL SIGNALS" and filed on Sep. 25, 2008. U.S. Patent Publication No. 2009/0082691 to Denison et al. is incorporated herein by reference in its entirety.

As described in U.S. Patent Publication No. 2009/0082691 to Denison et al., frequency selective signal monitor may utilize a heterodyning, chopper-stabilized amplifier architecture to convert a selected frequency band of a physiological signal to a baseband for analysis. The physiological signal may include a bioelectrical brain signal, which may be analyzed in one or more selected frequency bands to detect bioelectrical brain signals oscillating at a pathological frequency and, in response, deliver electrical stimulation to modulate the oscillating frequency of the bioelectrical brain signals in accordance with some of the techniques described herein. The frequency selective signal monitor may provide a physiological signal monitoring device comprising a physiological sensing element that receives a physiological signal, an instrumentation amplifier comprising a modulator that modulates the signal at a first frequency, an amplifier that amplifies the modulated signal, and a demodulator that demodulates the amplified signal at a second frequency different from the first frequency. A signal analysis unit may analyze a characteristic of the signal in the selected frequency band. The second frequency may be selected such that the demodulator substantially centers a selected frequency band of the signal at a baseband.

In some examples, sensing circuitry 46 may sense brain signals substantially at the same time that IMD 16 delivers therapy to patient 14. In other examples, sensing circuitry 46 may sense brain signals and IMD 16 may deliver therapy at different times.

In some examples, sensing circuitry 46 may monitor one or more physiological parameters of a patient other than that of bioelectrical brain signals, which are indicative of a patient disorder, e.g., in combination with the monitored bioelectrical brains signals of the patients. Suitable patient physiological parameters may include, but are not limited to, muscle tone (e.g., as sensed via electromyography (EMG)), eye movement (e.g., as sensed via electroculography (EOG) or EEG), and body temperature. In some examples, patient movement may be monitored via actigraphy. In one example, processing circuitry 40 may monitor an EMG signal reflective of the muscle tone of patient 12 to identify physical movement of the patient. Alternatively or additionally, processing circuitry 40 may monitor the physical movement of a patient via one or more motion sensors, such as, e.g., one or more single or multi-axis accelerometer devices.

In some examples, sensing circuitry 46 may monitor one or more physiological parameters of a patient other than that of bioelectrical brain signals, which are indicative of symptoms of a disease, such as Parkinson's disease or epilepsy. For examples, sensing circuitry 46 may monitor one or more parameters indicative of muscle stiffness or movement (slow movement, tremor, and lack of movement) with may correspond to one or more symptoms of Parkinson's disease. Such parameters may be detected by EMG signals, actigraphy, accelerometers signals, and/or other suitable signal. In some examples, in response to the detection of one or more symptoms of Parkinson's disease based on the monitoring of such parameter(s), IMD 16 may deliver electrical stimulation selected to entrain brain signals oscillating at a frequency associated with the detected symptoms, and then adjust the frequency to modulate the oscillation frequency of the brain signals to a frequency not associated with the detected symptoms.

Memory 42 may include any volatile or non-volatile media, such as a random access memory (RAM), read only memory (ROM), non-volatile RAM (NVRAM), electrically erasable programmable ROM (EEPROM), flash memory, and the like. Memory 42 may store computer-readable instructions that, when executed by processing circuitry 40, cause IMD 16 to perform various functions described herein. Memory 42 may be considered, in some examples, a non-transitory computer-readable storage medium comprising instructions that cause one or more processors, such as, e.g., processing circuitry 40, to implement one or more of the example techniques described in this disclosure. The term "non-transitory" may indicate that the storage medium is not embodied in a carrier wave or a propagated signal. However, the term "non-transitory" should not be interpreted to mean that memory 42 is non-movable. As one example, memory 42 may be removed from IMD 16, and moved to another device. In certain examples, a non-transitory storage medium may store data that can, over time, change (e.g., in RAM).

In the example shown in FIG. 2, the set of electrodes 24 of lead 20A includes four electrodes, and the set of electrodes 26 of lead 20B includes four electrodes. Processing circuitry 40 controls switch circuitry 48 to sense bioelectrical brain signals with selected combinations of electrodes 24, 26. In particular, switch circuitry 48 may create or cut off electrical connections between sensing circuitry 46 and selected electrodes 24, 26 in order to selectively sense bioelectrical brain signals, e.g., in particular portions of brain 28 of patient 12. Processing circuitry 40 may also control switch circuitry 48 to apply stimulation signals generated by stimulation generator 44 to selected combinations of electrodes 24, 26. In particular, switch circuitry 48 may couple stimulation signals to selected conductors within leads 20, which, in turn, deliver the stimulation signals across selected electrodes 24, 26. Switch circuitry 48 may be a switch array, switch matrix, multiplexer, or any other type of switching circuitry configured to selectively couple stimulation energy to selected electrodes 22A, 22B and to selectively sense bioelectrical brain signals with selected electrodes 24, 26. Hence, stimulation generator 44 is coupled to electrodes 24, 26 via switch circuitry 48 and conductors within leads 20. In some examples, however, IMD 16 does not include switch circuitry 48. In some examples, IMD 16 may include separate current sources and sinks for each individual electrode (e.g., instead of a single stimulation generator) such that switch circuitry 48 may not be necessary.

Stimulation generator 44 may be a single channel or multi-channel stimulation generator. For example, stimulation generator 44 may be capable of delivering, a single stimulation pulse, multiple stimulation pulses in a regular burst or an irregular pattern, or a continuous signal at a given time via a single electrode combination or multiple stimulation pulses at a given time via multiple electrode combinations. In some examples, however, stimulation generator 44 and switch circuitry 48 may be configured to deliver multiple channels on a time-interleaved basis. For example, switch circuitry 48 may serve to time divide the output of stimulation generator 44 across different electrode combinations at different times to deliver multiple programs or channels of stimulation energy to patient 12.

Telemetry circuitry 50 may support wireless communication between IMD 16 and an external programmer 14 or another computing device under the control of processing circuitry 40. Processing circuitry 40 of IMD 16 may, for example, transmit bioelectrical brain signals, seizure probability metrics for particular sleep stages, a seizure probability profile for patient 12, and the like via telemetry circuitry 50 to telemetry circuitry within programmer 14 or another external device. Telemetry circuitry 50 in IMD 16, as well as telemetry circuitry in other devices and systems described herein, such as programmer 14, may accomplish communication by radiofrequency (RF) communication techniques. In addition, telemetry circuitry 50 may communicate with external programmer 14 via proximal inductive interaction of IMD 16 with programmer 14. Accordingly, telemetry circuitry 50 may send information to external programmer 14 on a continuous basis, at periodic intervals, or upon request from IMD 16 or programmer 14.

Power source 52 delivers operating power to various components of IMD 16. Power source 52 may include a small rechargeable or non-rechargeable battery and a power generation circuit to produce the operating power. Recharging may be accomplished through proximal inductive interaction between an external charger and an inductive charging coil within IMD 16. In some examples, power requirements may be small enough to allow IMD 16 to utilize patient motion and implement a kinetic energy-scavenging device to trickle charge a rechargeable battery. In other examples, traditional batteries may be used for a limited period of time.

In accordance with one or more examples of the disclosure, processing circuitry 40 and/or processing circuitry of another device (e.g., processing circuitry of external programmer 14) may control sensing circuitry 46 to sense, via electrodes 24, 26 disposed along leads 20, one or more oscillations of a bioelectrical brain signal associated with a pathological disease of patient 12. In some examples, the one or more oscillations are within a Beta frequency range of about 11 Hertz to about 35 Hertz. In other examples, the one or more oscillations are within a Theta frequency band of about 4 Hertz to about 12 Hertz. In some examples, the one or more oscillations are associated with one or more symptoms of Parkinson's disease, such as tremor, rigidity, or bradykinesia, etc. In some examples, the one or more oscillations are associated with one or more symptoms of another disease, such as dystonia, essential tremor, Tourette's syndrome, obsessive compulsive disorder, epilepsy, or depression.

In response to sensing the one or more oscillations of the bioelectrical brain signal, processing circuitry 40 and/or processing circuitry of another device (e.g., processing circuitry of external programmer 14) may control stimulation generator 44 to generate and deliver, via electrodes 24, 26 disposed along leads 20, electrical stimulation to one or more regions of brain 28. In one example, processing circuitry 40 controls stimulation generator 44 to generate electrical stimulation comprising a frequency approximating that of the one or more oscillations and out of phase with the one or more oscillations. In other examples, processing circuitry 40 controls stimulation generator 44 to generate electrical stimulation comprising a frequency that is different from that of the one or more oscillations of the electrical signals of the brain and out of phase with the one or more oscillations so as to destructively interfere with the one or more oscillations present in the electrical signals of the brain. In some examples, processing circuitry 40 controls stimulation generator 44 to generate electrical stimulation comprising a waveform approximating that of the one or more oscillations.

Because the electrical stimulation is out of phase with the one or more oscillations of the bioelectrical brain signals of brain 28, the electrical stimulation destructively interferes with the one or more oscillations. This may reduce the amplitude of the one or more oscillations experienced at local tissue regions of brain 28. By reducing the amplitude of the one or more oscillations of the bioelectrical brain signals of brain 28 associated with the pathological disease, processing circuitry 40 of IMD 16 may suppress or reduce the symptoms of the pathological disease of patient 12.

Figure 3:
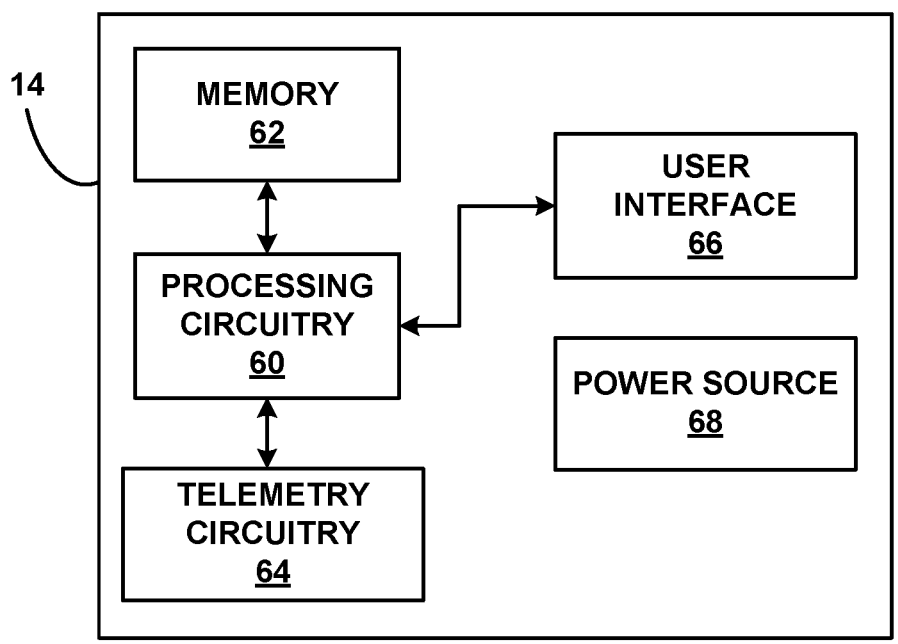
FIG. 3 is a functional block diagram illustrating components of an example medical device programmer.

FIG. 3 is a conceptual block diagram of an example external medical device programmer 14, which includes processing circuitry 60, memory 62, telemetry circuitry 64, user interface 66, and power source 68. Processing circuitry 60 controls user interface 66 and telemetry circuitry 64, and stores and retrieves information and instructions to and from memory 62. Programmer 14 may be configured for use as a clinician programmer or a patient programmer. Processing circuitry 60 may comprise any combination of one or more processors including one or more microprocessors, DSPs, ASICs, FPGAs, or other equivalent integrated or discrete logic circuitry. Accordingly, processing circuitry 60 may include any suitable structure, whether in hardware, software, firmware, or any combination thereof, to perform the functions ascribed herein to processing circuitry 60.

A user, such as a clinician or patient 12, may interact with programmer 14 through user interface 66. User interface 66 includes a display (not shown), such as a LCD or LED display or other type of screen, to present information related to treatment of the seizure disorder of patient 12. User interface 66 may also include an input mechanism to receive input from the user. The input mechanisms may include, for example, buttons, a keypad (e.g., an alphanumeric keypad), a peripheral pointing device or another input mechanism that allows the user to navigate though user interfaces presented by processing circuitry 60 of programmer 14 and provide input.

Memory 62 may include instructions for operating user interface 66 and telemetry circuitry 64, and for managing power source 68. Memory 62 may also store any therapy data retrieved from IMD 16 during the course of therapy, as well as sensed bioelectrical brain signals. The clinician may use this therapy data to determine the progression of the patient condition in order to plan future treatment. Memory 62 may include any volatile or nonvolatile memory, such as RAM, ROM, EEPROM or flash memory. Memory 62 may also include a removable memory portion that may be used to provide memory updates or increases in memory capacities. A removable memory may also allow sensitive patient data to be removed before programmer 14 is used by a different patient.

Memory 62 may be considered, in some examples, a non-transitory computer-readable storage medium comprising instructions that cause one or more processors, such as, e.g., processing circuitry 60, to implement one or more of the example techniques described in this disclosure. The term "non-transitory" may indicate that the storage medium is not embodied in a carrier wave or a propagated signal. However, the term "non-transitory" should not be interpreted to mean that memory 62 is non-movable. As one example, memory 62 may be removed from programmer 14, and moved to another device. In certain examples, a non-transitory storage medium may store data that can, over time, change (e.g., in RAM).

Wireless telemetry in programmer 14 may be accomplished by RF communication or proximal inductive interaction of external programmer 14 with IMD 16. This wireless communication is possible through the use of telemetry circuitry 64. Accordingly, telemetry circuitry 64 may be similar to the telemetry circuitry contained within IMD 16. In alternative examples, programmer 14 may be capable of infrared communication or direct communication through a wired connection. In this manner, other external devices may be capable of communicating with programmer 14 without needing to establish a secure wireless connection.

Power source 68 may deliver operating power to the components of programmer 14. Power source 68 may include a battery and a power generation circuit to produce the operating power. In some examples, the battery may be rechargeable to allow extended operation.

In some examples, a user, such as one or more of a clinician or patient 12, may access and configure IMD 16 via user interface 66 of programmer 14. For example, a clinician may program into IMD 16 one or more electrical stimulation therapy parameters defining an electrical stimulation therapy via user interface 66 of programmer 14. Further, the clinician may adjust the one or more electrical stimulation parameters of electrical stimulation therapy delivered by IMD 16.

Figure 4A:
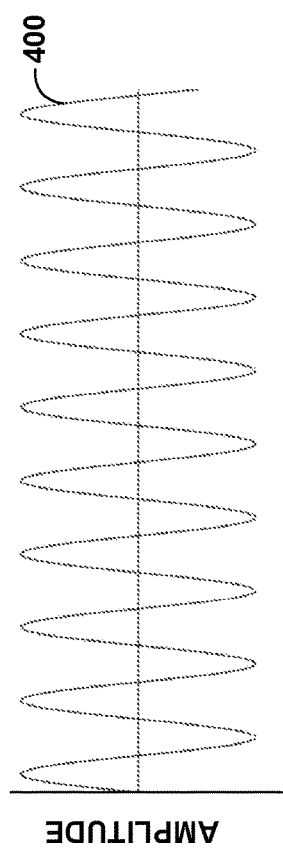
FIG. 4A is a chart illustrating example oscillations of a bioelectrical signal of a brain of a patient.
Figure 4B:
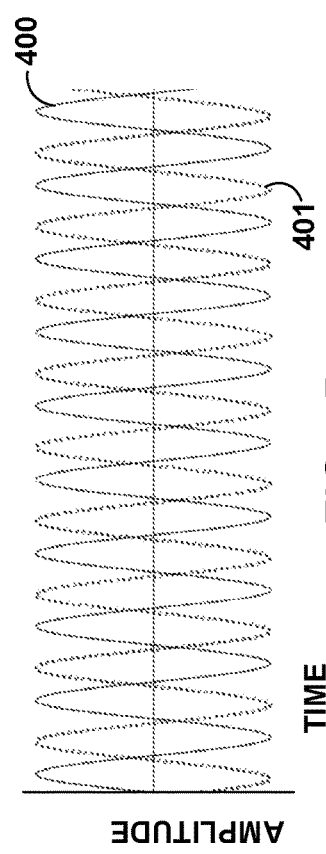
FIG. 4B is a chart illustrating example electrical stimulation delivered in accordance with the techniques of the disclosure.
Figure 4C:
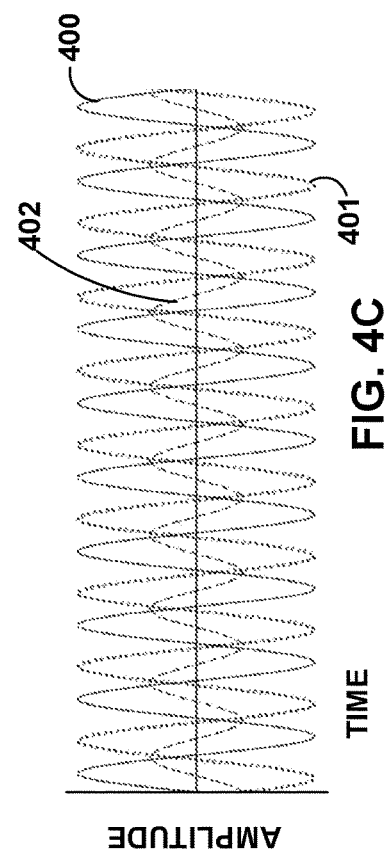
FIG. 4C is a chart illustrating an example bioelectrical signal observed at a tissue of a patient in the presence of the example oscillations of the bioelectrical signal of the brain of the patient as depicted in FIG. 4A and the example electrical stimulation of FIG. 4B.

FIGS. 4A-4C are charts illustrating example waveforms in accordance with the techniques of the disclosure. The examples of FIGS. 4A-4C are described with respect to FIG. 1 for convenience. FIG. 4A is a chart illustrating example oscillations of bioelectrical signal 400 of a brain 28 of patient 12. In the example of FIG. 4A, the oscillations of the bioelectrical signal comprise a frequency of about 27 Hertz. This example signal lies within the Beta frequency range and may be associated with the presence of one or more symptoms of Parkinson's disease. In other examples, the oscillations may comprise a frequency within a Theta frequency band of about 4 Hertz to about 12 Hertz or may be associated with the presence of one or more symptoms of other diseases. As described above, IMD 16 senses, via electrodes 24, 26 disposed along leads 20, the oscillations of bioelectrical signal 400. Although the frequency of the oscillations of bioelectrical signal 400 is shown in the example of FIG. 4A, and FIGS. 4B and 4C, this frequency of the oscillations may only be one component of the entire bioelectrical signal within the brain. For example, additional higher frequencies and/or lower frequencies, may also be present within the detected bioelectrical signal from the brain, but these other frequencies are not shown in order to focus the discussion on the lower frequency oscillations that may be associated with the presence of one or more symptoms of the patient.

FIG. 4B is a chart illustrating example electrical stimulation 401 delivered in accordance with the techniques of the disclosure. As described above, in response to sensing the oscillations of bioelectrical signal 400, IMD 16 generates electrical stimulation 401 comprising a frequency approximating the oscillations of bioelectrical signal 400 and out of phase with the oscillations of bioelectrical signal 400. In the example of FIG. 4B, electrical stimulation 401 comprises a frequency of about 27 Hertz. For ease of illustration, the example electrical stimulation 401 of FIG. 4B is 9π/10 radians out of phase with the oscillations of bioelectrical signal 400. However, in other examples, electrical stimulation 401 may be 180 degrees or π radians out of phase with the oscillations of bioelectrical signal 400. In yet further examples, electrical stimulation 401 comprises a burst of electrical stimulation pulses at frequency that is different than the frequency of oscillations of bioelectrical signal 400 of brain 28. Furthermore, for purposes of illustration, in the example of FIG. 4B, electrical stimulation 401 comprises an amplitude that is about equal to an amplitude of oscillations of bioelectrical signal 400 of brain 28. However, in other examples, electrical stimulation 401 comprises an amplitude that is different than (e.g., less than) the amplitude of oscillations of bioelectrical signal 400 of brain 28. IMD 16 delivers, via electrodes 24, 26 disposed along leads 20, electrical stimulation 401 to a tissue site of brain 28.

FIG. 4C is a chart illustrating an example bioelectrical signal 402 observed at a tissue site of a patient in the presence of the example oscillations of bioelectrical signal 400 of the brain of the patient as depicted in FIG. 4A and example electrical stimulation 401 of FIG. 4B. Bioelectrical signal 402 is the sum of the oscillations of the bioelectrical signal 400 and the electrical stimulation 401. As described above, because electrical stimulation 401 is out of phase with the one or more oscillations of bioelectrical brain signal 400 of brain 28, electrical stimulation 401 destructively interferes with the one or more oscillations of bioelectrical brain signal 400. Accordingly, bioelectrical signal 402 comprises an amplitude that is much less than either the amplitude of the oscillations of bioelectrical signal 400 or the amplitude of electrical stimulation 401. It is recognized that the phase of electrical stimulation 401 approaches 180 degrees or π radians out of phase with the phase of the oscillations of bioelectrical signal 400, the greater the reduction in bioelectrical signal 402 at the local tissue site of brain 28. By reducing the amplitude of the one or more oscillations of the bioelectrical brain signals of brain 28 associated with the pathological disease, processing circuitry 40 of IMD 16 may suppress or reduce the symptoms of the pathological disease of patient 12.

Figure 5:
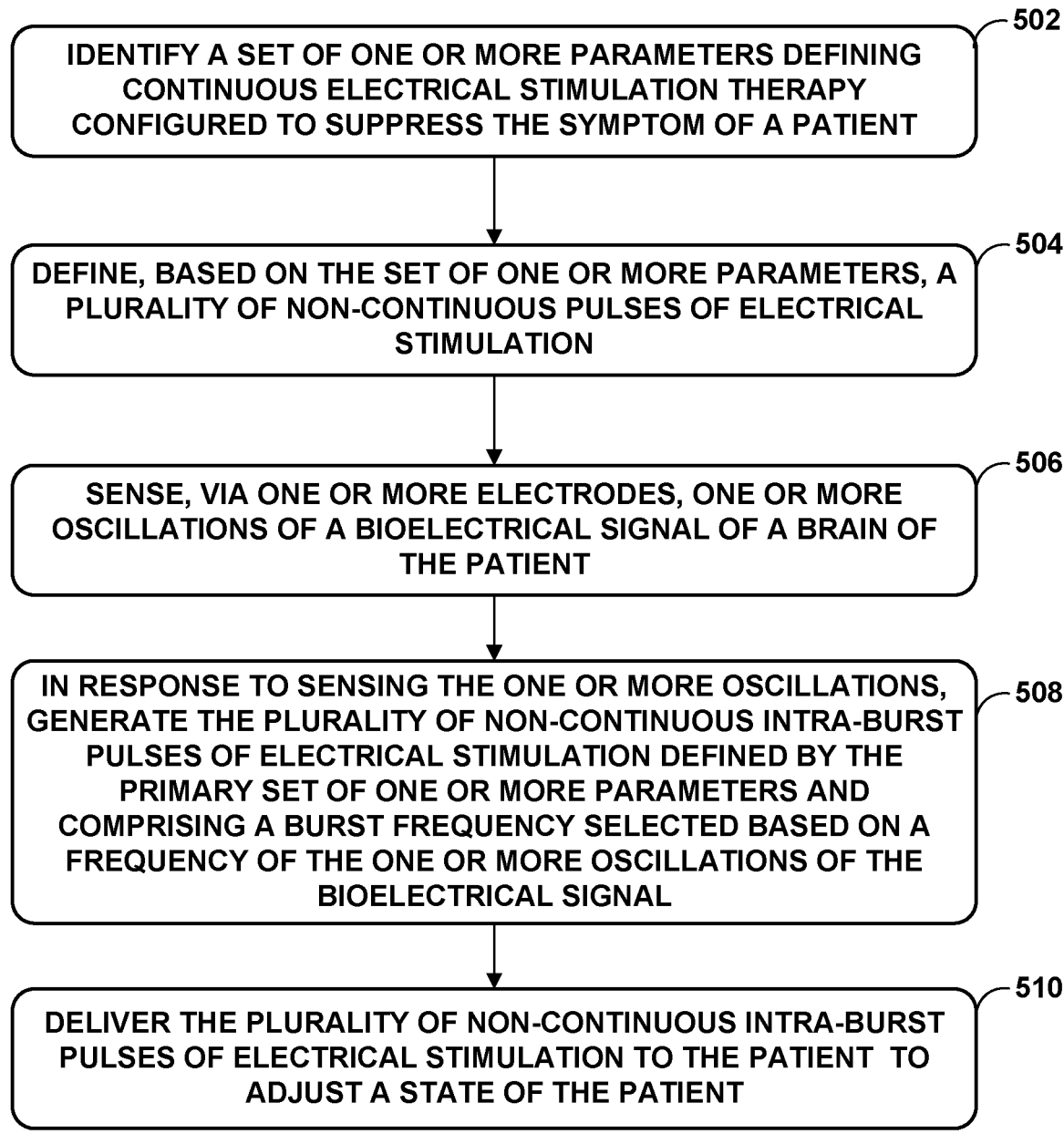
FIG. 5 is a flow diagram illustrating an example operation for delivering electrical stimulation therapy to the brain of a patient in accordance with the techniques of the disclosure.

FIG. 5 is a flow diagram illustrating an example operation for delivering electrical stimulation therapy to the brain of a patient in accordance with the techniques of the disclosure. For ease of illustration, the example of FIG. 5 is described with regard to therapy system 10 of FIG. 1. However, the same or substantially similar techniques may be employed in any suitable systems or devices capable of delivering electrical stimulation to the brain of patient 12. Also, as described above, while the example techniques of FIG. 5 are described with regard to the treatment of Parkinson's disease by disrupting bioelectrical brain signals with oscillation frequencies associated with one or more motor symptoms of Parkinson's disease, such techniques may be employed to treat patient disorders other than that of Parkinson's disease, such as epilepsy.

In one example, system 10 identifies a set of one or more parameters defining continuous electrical stimulation therapy configured to suppress the symptom of the patient associated with the one or more oscillations of the bioelectrical signal (502). In one example, the clinician programs, via programmer 14, the plurality of sets of the one or more parameters defining the continuous electrical stimulation therapy into IMD 30. In one example of a voltage-controlled system, the continuous electrical stimulation therapy comprises a plurality of electrical stimulation pulses comprising a pulse frequency of about 130 Hertz, a pulse width selected from about 20 microseconds to about 450 microseconds, and a voltage amplitude selected from about 2.5 Volts to 3 Volts. In one example of a current-controlled system, the continuous electrical stimulation therapy comprises a plurality of electrical stimulation pulses comprising a pulse frequency of 130 Hertz, a pulse width selected from about 20 microseconds to about 450 microseconds, and a current amplitude selected from about 2.5 milliamps to 3 milliamps. In some examples, system 10 delivers, by IMD 30 and electrodes 24, 26, the continuous electrical stimulation therapy to patient 12 to suppress the symptom of the patient associated with the one or more oscillations of the bioelectrical signal.

In yet further examples of a voltage-controlled system, the continuous electrical stimulation therapy comprises a plurality of electrical stimulation pulses comprising a pulse frequency selected from a range of about 5 Hertz to about 250 Hertz, a pulse width selected from about 10 microseconds to about 450 microseconds, and a voltage amplitude selected from about 0.25 Volts to 10 Volts. In one example of a current-controlled system, the continuous electrical stimulation therapy comprises a plurality of electrical stimulation pulses comprising a pulse frequency selected from a range of about 5 Hertz to about 250 Hertz, a pulse width selected from about 10 microseconds to about 450 microseconds, and a current amplitude selected from about 0.25 milliamps to 25 milliamps.

In some examples, the one or more parameters include one or more of a combination of stimulation electrodes 24, 26, one of a voltage amplitude or a current amplitude, an electrical stimulation pulse width, a number of electrical stimulation pulses per burst, a particular irregular pattern of stimulation pulses, an inter-burst frequency, and/or an intra-burst frequency. In one example, the clinician performs a monopolar electrode review to determine the one or more parameters. For example, the clinician may titrate various parameters of the electrical stimulation to determine the set of one or more parameters for defining the electrical stimulation subsequently delivered to the patient.

In one example, the clinician compares each set of the plurality of sets of one or more parameters to a strength-duration curve of efficacy at activating one or more neurons of patient 12. In this example of the strength-duration curve, as the amplitude of electrical stimulation increases, a duration of a pulse width of the electrical stimulation required to activate the one or more neurons decreases. Similarly, as the duration of the pulse width of the electrical stimulation increases, the amplitude of electrical stimulation required to activate the one or more neurons decreases. There exists a value for the amplitude of electrical stimulation and the pulse width of the electrical stimulation along the strength-duration curve that is most efficient for a particular system 10. Thus, the clinician determines selects a set of one or more parameters that comprises the stimulation amplitude and an electrical stimulation pulse width that effectively suppresses the symptom of the patient associated with the one or more oscillations of the bioelectrical signal and that is power efficient for system 10 for delivery to patient 12.

Next, system 10 switches from delivering the continuous electrical stimulation therapy at conventional settings to delivering electrical stimulation therapy based on the sensed oscillations of the bioelectrical brain signals. In some examples, the electrical stimulation therapy comprises continuous stimulation pulses comprising a frequency selected to match the sensed oscillations of the bioelectrical brain signals. In some examples, the electrical stimulation therapy comprises regular or irregular patterns of bursts of electrical stimulation pulses characterized by an intra-burst frequency matching a frequency of the continuous electrical stimulation therapy, and an inter-burst frequency substantially similar to a frequency of the one or more oscillations of the bioelectrical signal of brain 28 of patient 12 but substantially out of phase with the one or more oscillations. In other examples, the inter-burst frequency is substantially similar to the frequency of the one or more oscillations of the bioelectrical signal of brain 28 of patient 12 but substantially in phase with the one or more oscillations. In other examples, system 10 defines the regular pattern of bursts of electrical stimulation pulses and delivers the regular pattern of bursts of electrical stimulation without first delivering continuous electrical stimulation.

For example, system 10 defines, based on the set of one or more parameters, a plurality of non-continuous pulses of electrical stimulation (504). In one example, the plurality of non-continuous pulses of electrical stimulation comprise an intra-burst frequency about equal to that of a frequency of the continuous electrical stimulation therapy (e.g., a frequency of about 2 Hertz to about 250 Hertz). In further examples, the intra-burst frequency is selected from a range of about 2 Hertz to about 1000 Hertz). In further examples, the plurality of non-continuous pulses of electrical stimulation comprise an inter-burst frequency of about 11 Hertz to about 35 Hertz. In some examples, the plurality of non-continuous pulses of electrical stimulation comprise a pulse width selected from about 20 microseconds to about 450 microseconds. In one example, the pulse burst duration is less than the inter-burst frequency and is selected from about 2 milliseconds to 10 milliseconds. In an example where the inter-burst frequency is selected from about 50 Hertz to about 70 Hertz, the plurality of non-continuous pulses of electrical stimulation comprise a pulse width selected from about 1 milliseconds to 4 milliseconds. In other examples where the inter-burst frequency is selected from about 1 Hertz to about 10 Hertz, the plurality of non-continuous pulses of electrical stimulation comprise a pulse width selected from about 10 milliseconds to 50 milliseconds. In an example of a voltage-controlled system, the plurality of non-continuous pulses of electrical stimulation comprise a voltage amplitude selected from about 1.5 Volts to 4 Volts. In an example of a current-controlled system, the plurality of non-continuous pulses of electrical stimulation comprise a voltage amplitude selected from about 1.0 milliamps to 3.5 milliamps. In some examples, system 10 defines the plurality of non-continuous pulses of electrical stimulation without delivering the plurality of non-continuous pulses of electrical stimulation to patient 12.

Further, IMD 10 senses, via electrodes 24, 26, the one or more oscillations of the bioelectrical signal of brain 28 of patient 12 (506). In response to sensing the one or more oscillations, IMD 10 generates, via stimulation generator 44, the plurality of non-continuous pulses of electrical stimulation defined by the set of one or more parameters and comprising an inter-burst frequency selected based on a frequency of the one or more oscillations of the bioelectrical signal of brain 28 of patient 12 (508). In some examples, IMD 10 adjusts an inter-burst frequency of the plurality of non-continuous pulses of electrical stimulation to more closely match a frequency of the one or more oscillations. In some examples, IMD 10 adjusts an inter-burst frequency of the plurality of non-continuous pulses of electrical stimulation to match a patient-specific frequency of the one or more oscillations. In yet further examples, IMD 10 selects an inter-burst frequency of the plurality of non-continuous pulses of electrical stimulation to match a patient-specific frequency of the one or more oscillations. In some examples, IMD 10 delivers the plurality of non-continuous pulses of electrical stimulation substantially out of phase with the one or more oscillations of the bioelectrical signal of brain 28 of patient 12. In some examples, the plurality of non-continuous pulses of electrical stimulation are about 180 degrees (e.g., $\pi$ radians) out of phase with the one or more oscillations. In other examples, IMD 10 delivers the plurality of non-continuous pulses of electrical stimulation substantially in phase with the one or more oscillations of the bioelectrical signal of brain 28 of patient 12. In some examples, the plurality of non-continuous pulses of electrical stimulation are greater than −120 degrees and less than +120 degrees (e.g., greater than $-\frac{2}{3}\pi$ radians and less than $\frac{2}{3}\pi$ radians) out of phase with the one or more oscillations.

In some examples, a clinician performs the above selections and adjustments of stimulation frequency, timing, and phase based on a single measurement of the frequency of the oscillations of the bioelectrical brain signals (e.g., such as while a patient visits a clinic). In other examples, IMD 10 may select parameters for the electrical stimulation therapy based on the sensed oscillations of the bioelectrical brain signals on a continuous, periodic, or scheduled basis, such as when the patient is at home or outside of the clinic.

By performing the adjustments to the electrical stimulation on a continuous basis, IMD 10 may account for changes in the oscillations of the bioelectrical brain signals over time. Such changes may be driven by changes in the disease progress, different patient states (such as when the patient is awake or asleep), or changes in concomitant therapy (such as medication intake). IMD 10 may sense the one or more oscillations of the bioelectrical signal at any time, such as prior to determining the plurality of non-continuous pulses of electrical stimulation or generating the plurality of non-continuous pulses of electrical stimulation. In further examples, IMD 10 senses the one or more oscillations of the bioelectrical signal over time and determines a new plurality of non-continuous pulses of electrical stimulation as required to effectively suppress the oscillations of the bioelectrical brain signals of the patient.

IMD 10 delivers, via electrodes 24, 26, the plurality of non-continuous pulses of electrical stimulation to modulate a state of the patient associated with the one or more oscillations of the bioelectrical signal (510). In one example, IMD 10 delivers the plurality of non-continuous pulses of electrical stimulation substantially out of phase with the one or more oscillations of the bioelectrical signal to suppress one or more symptoms of Parkinson's disease. In another example, IMD 10 delivers the plurality of non-continuous pulses of electrical stimulation substantially out of phase with the one or more oscillations of the bioelectrical signal to suppress one or more symptoms of epilepsy. In yet a further example, IMD 10 delivers the plurality of non-continuous pulses of electrical stimulation substantially in phase with the one or more oscillations of the bioelectrical signal to promote a favorable brain state such as high quality sleep in patient 12.

In yet a further example, IMD 10 delivers the plurality of non-continuous pulses of electrical stimulation as Stochastic Resonance to patient 12 to increase a strength of a weak but desirable bioelectrical signal of brain 28. In this example, the plurality of non-continuous pulses of electrical stimulation comprise "white noise" (e.g., a set of electrical pulses at random oscillations, amplitudes, and/or frequencies). IMD 10 delivers the plurality of non-continuous pulses of electrical stimulation to brain 28 of patient 12. The plurality of non-continuous pulses of electrical stimulation may use Stochastic Resonance to increase (e.g., constructively interfere with) the weak but desirable bioelectrical signal, thereby improving the signal-to-noise ratio of the weak but desirable bioelectrical signal. In some examples, the weakened but desirable bioelectrical signal is a bioelectrical signal associated with a favorable brain state, such as high quality sleep in patient 12. Such techniques may be used to promote the favorable brain state or to increase detectability of the weak but desirable bioelectrical signal by other sensors of system 10.

The example of FIG. 5 may be used to treat or otherwise manage a patient disorder by reducing or substantially eliminating manifestations of the disorder associated with certain types of bioelectrical brain signals. For example, the oscillation of bioelectrical brain signals at a certain frequency may correspond to pathological brain signals in the sense that the oscillation of the brain signals at the frequency are associated with the manifestation of one or more symptoms or undesired effects of the patient disorder. Pathological brain signal frequencies may be specific to one or more regions of brain 28, and may be patient and/or disorder specific.

For example, for Parkinson's disease, the frequency in the example of FIG. 5 may generally correspond to one more oscillation frequencies with a Beta band (between approximately 12 Hertz to approximately 35 Hertz). As described above, in the case of Parkinson's disease, Beta frequency oscillations in the subthalamic nucleus (STN), globus pallidus interna (GPi), globus pallidus externa (GPe), and/or other areas of the basal ganglia may be associated with one or more motor symptoms including, e.g., rigidity, akinesia, bradykinesia, dyskinesia, and/or resting tremor. These motor symptoms may be associated with bioelectrical brain signals oscillating in the beta frequency range in the sense that such symptoms frequently occur when the bioelectrical brain signals within the above regions of brain 28 oscillate within the beta frequency range. While Beta frequency oscillations may be present in some degree in many patients, Parkinsons patients may display an exaggerated presence of beta frequency oscillations that are associated with one or more symptom manifestations. In some examples, indicators such as oscillatory activity (e.g., signal energy) may be quantified in terms of measured local field potential power, or may be quantified as a relative power (e.g., as a percentage of signal power within a given frequency band to the overall signal power), using fast Fourier transform (FFT) techniques, for example, or Beta burst may be used as indicators of pathological brain. Regardless of how the pathological brain signals are identified, by disrupting the oscillations of the bioelectrical brain signals within one or more of the above pathological frequency regions, motor symptoms that manifest themselves when Beta frequency oscillations are present may be reduced or substantially eliminated using the example technique of FIG. 5.

The techniques described in this disclosure may be implemented, at least in part, in hardware, software, firmware or any combination thereof. For example, various aspects of the techniques may be implemented within one or more microprocessors, DSPs, ASICs, FPGAs, or any other equivalent integrated or discrete logic circuitry, as well as any combinations of such components, embodied in programmers, such as physician or patient programmers, stimulators, or other devices. The term "processor" or "processing circuitry" may generally refer to any of the foregoing logic circuitry, alone or in combination with other logic circuitry, or any other equivalent circuitry.

Such hardware, software, and firmware may be implemented within the same device or within separate devices to support the various operations and functions described in this disclosure. In addition, any of the described units, circuitry, modules or components may be implemented together or separately as discrete but interoperable logic devices. Depiction of different features as circuitry, modules, or units is intended to highlight different functional aspects and does not necessarily imply that such circuitry, modules, or units must be realized by separate hardware or software components. Rather, functionality associated with one or more modules, circuits, or units may be performed by separate hardware or software components, or integrated within common or separate hardware or software components.

When implemented in software, the functionality ascribed to the systems and devices described in this disclosure may be embodied as instructions on a computer-readable medium such as RAM, ROM, NVRAM, EEPROM, FLASH memory, magnetic media, optical media, or the like. The instructions may be executed to support one or more aspects of the functionality described in this disclosure.

If implemented in software, the techniques described in this disclosure may be stored on or transmitted over as one or more instructions or code on a computer-readable medium. Computer-readable media may include non-transitory computer storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such data storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

In addition, it should be noted that the systems described herein may not be limited to treatment of a human patient. In alternative examples, these systems may be implemented in non-human patients, e.g., primates, canines, equines, pigs, and felines. These animals may undergo clinical or research therapies that my benefit from the subject matter of this disclosure.

Various examples of the disclosure have been described. These and other examples are within the scope of the following claims.

What is claimed is:

1. A method comprising:
    sensing, via one or more electrodes, one or more oscillations of a bioelectrical signal of a brain of a patient; and
    in response to sensing the one or more oscillations:
        identifying, by a medical device and based on measured powers of respective frequencies of the one or more oscillations of the bioelectrical signal, a pathological frequency of the one or more oscillations of the bioelectrical signal;
        selecting, by the medical device and based on the identified pathological frequency of the one or more oscillations of the bioelectrical signal, an inter-burst frequency for a plurality of bursts of stimulation therapy pulses;
        generating, by the medical device, the plurality of bursts of stimulation therapy pulses comprising the inter-burst frequency; and
        delivering, by the medical device, the plurality of bursts of stimulation therapy pulses to the patient to modulate a state of the patient associated with the one or more oscillations of the bioelectrical signal.

2. The method of claim 1, wherein delivering the plurality of bursts of stimulation therapy pulses to the patient to modulate the state of the patient associated with the one or more oscillations of the bioelectrical signal comprises delivering the plurality of bursts of stimulation therapy pulses to the patient to suppress a symptom of the patient associated with the one or more oscillations of the bioelectrical signal.

3. The method of claim 2, wherein delivering the plurality of bursts of stimulation therapy pulses comprises delivering the plurality of bursts of stimulation therapy pulses during an occurrence of the symptom of the patient.

4. The method of claim 2, wherein the symptom of the patient is a symptom associated with one or more of:
    Parkinson's disease;
    dystonia;
    essential tremor;
    Tourette's syndrome;
    obsessive compulsive disorder;
    epilepsy; or
    depression.

5. The method of claim 1, wherein the inter-burst frequency selected based on the identified pathological frequency of the one or more oscillations of the bioelectrical signal is out of phase with the identified pathological frequency of the one or more oscillations.

6. The method of claim 5, wherein the inter-burst frequency selected based on the identified pathological frequency of the one or more oscillations of the bioelectrical signal is 180 degrees out of phase with the identified pathological frequency of the one or more oscillations.

7. The method of claim 1, wherein delivering the plurality of bursts of stimulation therapy pulses to the patient to modulate the state of the patient associated with the one or more oscillations of the bioelectrical signal comprises delivering the plurality of bursts of stimulation therapy pulses to the patient to promote the state of the patient associated with the one or more oscillations of the bioelectrical signal.

8. The method of claim 7, wherein the state of the patient is one of:
    a waking state of the patient; or
    a sleeping state of the patient.

9. The method of claim 7, wherein delivering the plurality of bursts of stimulation therapy pulses comprises delivering the plurality of bursts of stimulation therapy pulses during an occurrence of the state of the patient.

10. The method of claim 1, wherein the inter-burst frequency selected based on the identified pathological frequency of the one or more oscillations of the bioelectrical signal is in phase with the identified pathological frequency of the one or more oscillations.

11. The method of claim 1, wherein the inter-burst frequency selected based on the identified pathological frequency of the one or more oscillations of the bioelectrical signal is greater than −120 degrees and less than +120 degrees out of phase with the identified pathological frequency of the one or more oscillations.

12. The method of claim 1, wherein each of the plurality of bursts of stimulation therapy pulses comprises an amplitude substantially similar to an amplitude of each of the one or more oscillations.

13. The method of claim 1, wherein the identified pathological frequency of the one or more oscillations comprises a frequency within a Theta frequency band from about 4 Hertz to about 12 Hertz.

14. The method of claim 1, wherein the identified pathological frequency of the one or more oscillations comprises a frequency within a Beta frequency band from about 13 Hertz to about 30 Hertz.

15. The method of claim 1, wherein the identified pathological frequency of the one or more oscillations comprises a frequency within a Gamma frequency band from about 35 Hertz to about 200 Hertz.

16. The method of claim 1, wherein the inter-burst frequency selected based on the identified pathological frequency of the one or more oscillations of the bioelectrical signal is the same as the identified pathological frequency of the one or more oscillations.

17. The method of claim 1, wherein the inter-burst frequency selected based on the identified pathological frequency of the one or more oscillations of the bioelectrical signal is different from the identified pathological frequency of the one or more oscillations.

18. The method of claim 1, further comprising:
prior to generating the plurality of bursts of stimulation therapy pulses and delivering the plurality of bursts of electrical pulses:
determining a set of one or more parameters defining continuous stimulation therapy configured to modulate the state of the patient associated with the one or more oscillations of the bioelectrical signal; and
defining, based on the set of one or more parameters, the plurality of bursts of stimulation; and
wherein delivering the plurality of bursts of stimulation therapy pulses to the patient comprises delivering a plurality of non-continuous bursts of stimulation therapy pulses to the patient.

19. The method of claim 18, wherein the set of one or more parameters comprises a stimulation amplitude and a stimulation pulse width, and
wherein determining the set of one or more parameters comprises identifying each of the stimulation amplitude and stimulation pulse width of the set of the one or more parameters based on an energy efficient amplitude and pulse width selected from a strength-duration curve for nerve tissue receiving the continuous stimulation therapy.

20. The method of claim 1, wherein generating the plurality of bursts of stimulation therapy pulses comprises generating a plurality of bursts of electrical stimulation therapy pulses.

21. The method of claim 1, wherein the method further comprises measuring, by the medical device, powers of the respective frequencies of the one or more oscillations of the bioelectrical signal.

22. The method of claim 21,
wherein measuring the powers of the respective frequencies of the one or more oscillations of the bioelectrical signal comprises measuring powers of respective frequencies within different frequency bands of the one or more oscillations of the bioelectrical signal, and
wherein identifying the pathological frequency of the one or more oscillations of the bioelectrical signal comprises identifying the pathological frequency within a frequency band of the one or more oscillations of the bioelectrical signal based on the measured powers of respective frequencies within the different frequency bands of the one or more oscillations of the bioelectrical signal.

23. The method of claim 1, wherein selecting the inter-burst frequency comprises selecting the inter-burst frequency to match the inter-burst frequency to the identified pathological frequency of the one or more oscillations of the bioelectrical signal.

24. A medical system comprising:
one or more electrodes configured to sense one or more oscillations of a bioelectrical signal of a brain of a patient; and
a medical device configured to:
identify, based on measured powers of respective frequencies of the one or more oscillations of the bioelectrical signal, a pathological frequency of the one or more oscillations of the bioelectrical signal;
select, based on the identified pathological frequency of the one or more oscillations of the bioelectrical signal, an inter-burst frequency for a plurality of bursts of stimulation therapy pulses;
generate, in response to the sensed one or more oscillations, the plurality of bursts of stimulation therapy pulses comprising the inter-burst frequency; and
deliver the plurality of bursts of stimulation therapy pulses to the patient to modulate a state of the patient associated with the one or more oscillations of the bioelectrical signal.

25. The medical system of claim 24, wherein, to deliver the plurality of bursts of stimulation therapy pulses to the patient to modulate the state of the patient associated with the one or more oscillations of the bioelectrical signal, the medical system is further configured to deliver the plurality of bursts of stimulation therapy pulses to the patient to suppress a symptom of the patient associated with the one or more oscillations of the bioelectrical signal.

26. The method of claim 25, wherein, to deliver the plurality of bursts of stimulation therapy pulses, the medical system is further configured to deliver the plurality of bursts of stimulation therapy pulses during an occurrence of the symptom of the patient.

27. The medical system of claim 25, wherein the symptom of the patient is a symptom associated with one or more of:
Parkinson's disease;
dystonia;
essential tremor;
Tourette's syndrome;
obsessive compulsive disorder;
epilepsy; or
depression.

28. The medical system of claim 24, wherein the inter-burst frequency selected based on the identified pathological frequency of the one or more oscillations of the bioelectrical signal is out of phase with the identified pathological frequency of the one or more oscillations.

29. The medical system of claim 24, wherein, to deliver the plurality of bursts of stimulation therapy pulses to the patient to modulate the state of the patient associated with the one or more oscillations of the bioelectrical signal, the medical system is further configured to deliver the plurality of bursts of stimulation therapy pulses to the patient to promote the state of the patient associated with the one or more oscillations of the bioelectrical signal.

30. The medical system of claim 29, wherein the state of the patient is one of:
a waking state of the patient; or
a sleeping state of the patient.

31. The medical system of claim 24, wherein the inter-burst frequency selected based on the identified pathological frequency of the one or more oscillations of the bioelectrical signal is in phase with the identified pathological frequency of the one or more oscillations.

32. The medical system of claim 24, wherein the identified pathological frequency of the one or more oscillations comprises a frequency within a Theta frequency band from about 4 Hertz to about 12 Hertz.

33. The medical system of claim 24, wherein the identified pathological frequency of the one or more oscillations comprises a frequency within a Beta frequency band from about 13 Hertz to about 30 Hertz.

34. The medical system of claim 24, wherein the identified pathological frequency of the one or more oscillations comprises a frequency within a Gamma frequency band from about 35 Hertz to about 200 Hertz.

35. The medical system of claim 24, wherein the inter-burst frequency selected based on the identified pathological frequency of the one or more oscillations of the bioelectrical signal is the same as the identified pathological frequency of the one or more oscillations.

36. The medical system of claim 24, wherein the medical device is further configured to:

prior to generating the plurality of bursts of stimulation therapy pulses and delivering the plurality of bursts of electrical pulses:
   determine a set of one or more parameters defining continuous stimulation therapy configured to modulate the state of the patient associated with the one or more oscillations of the bioelectrical signal; and
   define, based on the set of one or more parameters, the plurality of bursts of stimulation; and
wherein, to deliver the plurality of bursts of stimulation therapy pulses to the patient, the medical device is further configured to deliver a plurality of non-continuous bursts of stimulation therapy pulses to the patient.

37. The medical system of claim 36, wherein the set of one or more parameters comprises a stimulation amplitude and a stimulation pulse width, and
   wherein, to determine the set of one or more parameters, the medical device is further configured to identify each of the stimulation amplitude and stimulation pulse width of the set of one or more parameters based on an energy efficient amplitude and pulse width selected from a strength-duration curve for nerve tissue receiving the continuous stimulation therapy.

38. The medical system of claim 24, wherein the plurality of bursts of stimulation therapy pulses comprise a plurality of bursts of electrical stimulation therapy pulses.

39. A medical system comprising:
   means for sensing one or more oscillations of a bioelectrical signal of a brain of a patient;
   means for identifying, in response to sensing the one or more oscillations and based on measured powers of respective frequencies of the one or more oscillations of the bioelectrical signal, a pathological frequency of the one or more oscillations of the bioelectrical signal;
   means for selecting, based on the identified pathological frequency of the one or more oscillations of the bioelectrical signal, an inter-burst frequency for a plurality of bursts of stimulation therapy pulses;
   means for generating the plurality of bursts of stimulation therapy pulses comprising the inter-burst frequency; and
   means for delivering the plurality of bursts of stimulation therapy pulses to the patient to modulate a state of the patient associated with the one or more oscillations of the bioelectrical signal.

* * * * *